United States Patent
Schuster et al.

(10) Patent No.: US 6,937,699 B1
(45) Date of Patent: Aug. 30, 2005

(54) SYSTEM AND METHOD FOR ADVERTISING USING DATA NETWORK TELEPHONE CONNECTIONS

(75) Inventors: Guido M. Schuster, Des Plaines, IL (US); Ikhlaq S. Sidhu, Vernon Hills, IL (US); Jerry J. Mahler, Prospect Heights, IL (US); Frederick D. Dean, Chicago, IL (US); Jacek A. Grabiec, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/406,320

(22) Filed: Sep. 27, 1999

(51) Int. Cl.⁷ .............................................. H04M 1/64
(52) U.S. Cl. .................... 379/67.1; 379/76; 379/88.11; 379/88.12; 379/88.13; 379/88.17
(58) Field of Search ..................... 379/67.1, 72, 76, 379/88.11, 88.13, 88.17, 88.22, 93.12, 201.01, 265.02, 265.09, 266.01, 900, 908, 904

(56) References Cited

U.S. PATENT DOCUMENTS

| | | | | |
|---|---|---|---|---|
| 4,313,035 A | | 1/1982 | Jordan et al. ............ | 379/211.02 |
| 4,850,007 A | * | 7/1989 | Marino et al. ............ | 379/67.1 |
| 4,953,198 A | | 8/1990 | Daly et al. ............ | 379/61 |
| 4,973,837 A | | 11/1990 | Bradbeer ............ | 250/221 |
| 5,428,663 A | | 6/1995 | Grimes et al. ............ | 379/57 |
| 5,448,623 A | | 9/1995 | Wiedeman et al. ............ | 379/59 |
| 5,471,616 A | | 11/1995 | Johnson et al. ............ | 395/700 |
| 5,497,339 A | | 3/1996 | Bernard ............ | 364/705.05 |
| 5,557,658 A | * | 9/1996 | Gregorek et al. ............ | 379/67 |
| 5,563,937 A | | 10/1996 | Bruno et al. ............ | 379/201 |
| 5,606,594 A | | 2/1997 | Register et al. ............ | 379/58 |
| 5,646,945 A | | 7/1997 | Bergler ............ | 370/419 |
| 5,727,057 A | | 3/1998 | Emery et al. ............ | 379/211 |
| 5,732,074 A | | 3/1998 | Spaur et al. ............ | 370/313 |
| 5,732,216 A | * | 3/1998 | Logan et al. ............ | 395/200.33 |
| 5,742,905 A | | 4/1998 | Pepe et al. ............ | 455/461 |
| 5,838,665 A | | 11/1998 | Kahn et al. ............ | 370/260 |
| 5,875,405 A | | 2/1999 | Honda ............ | 455/564 |

(Continued)

FOREIGN PATENT DOCUMENTS

| | | |
|---|---|---|
| DE | 198 13 179 A 1 | 9/1999 |
| EP | 0 578 374 A1 | 6/1993 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |

(Continued)

OTHER PUBLICATIONS

"Understanding Packet Voice Protocols"; The International Engineering Consortium; http://www.iec.org.

U.S. Appl. No. 09/451,388, filed Nov. 30, 1999, Guido M. Schuster et al.

U.S. Appl. No. 09/515,365, filed Feb. 29, 2000, Guido M. Schuster et al.

(Continued)

*Primary Examiner*—Allan Hoosain
(74) *Attorney, Agent, or Firm*—McDonnell Boehnen Hulbert & Berghoff LLP

(57) ABSTRACT

A system and method for providing advertising and advertising services using a telephone system. A data network telephony system includes a commercial message server that communicates with a telephony connection server to communicate commercial messages to display devices on data network telephones. A caller uses the data network telephone to make a telephone call to a callee. The commercial message server receives information about the connection and retrieves commercial messages, or advertisements to communicate to either the caller, the callee or both.

7 Claims, 13 Drawing Sheets

U.S. PATENT DOCUMENTS

| | | | |
|---|---|---|---|
| 5,884,032 A * | 3/1999 | Bateman et al. | 709/204 |
| 5,894,473 A | 4/1999 | Dent | 370/342 |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | 455/414 |
| 5,933,778 A | 8/1999 | Buhrmann et al. | 455/461 |
| 5,933,811 A * | 8/1999 | Angles et al. | 705/14 |
| 5,938,757 A | 8/1999 | Bertsch | 712/36 |
| 5,958,014 A * | 9/1999 | Cave | 709/229 |
| 5,960,340 A | 9/1999 | Fuentes | 455/417 |
| 5,970,059 A | 10/1999 | Ahopelto et al. | 370/338 |
| 5,970,124 A * | 10/1999 | Csaszar et al. | 379/88.18 |
| 5,991,394 A * | 11/1999 | Dezonno et al. | 379/265 |
| 5,999,965 A * | 12/1999 | Kelly | 709/202 |
| 6,006,272 A | 12/1999 | Aravamudan et al. | 709/245 |
| 6,031,904 A | 2/2000 | An et al. | 379/201 |
| 6,046,762 A * | 4/2000 | Sonesh et al. | 348/16 |
| 6,075,992 A | 6/2000 | Moon et al. | 455/455 |
| 6,084,584 A | 7/2000 | Nahi et al. | 345/329 |
| 6,108,406 A * | 8/2000 | Mitchell et al. | 379/93.25 |
| 6,141,341 A | 10/2000 | Jones et al. | 370/352 |
| 6,161,134 A | 12/2000 | Wang et al. | 709/220 |
| 6,163,598 A | 12/2000 | Moore | 379/93.23 |
| 6,167,040 A | 12/2000 | Haeggstrom | 370/352 |
| 6,175,860 B1 | 1/2001 | Gaucher | 709/208 |
| 6,188,688 B1 | 2/2001 | Buskirk, Jr. | 370/389 |
| 6,212,261 B1 | 4/2001 | Meubus et al. | 379/88.12 |
| 6,216,158 B1 | 4/2001 | Luo et al. | 709/217 |
| 6,226,362 B1 * | 5/2001 | Gerszberg et al. | 379/88.13 |
| 6,240,097 B1 | 5/2001 | Weslock et al. | 370/341 |
| 6,275,574 B1 * | 8/2001 | Oran | 379/201 |
| 6,285,364 B1 * | 9/2001 | Giordano, III et al. | 345/347 |
| 6,301,609 B1 | 10/2001 | Aravamudan et al. | 709/207 |
| 6,308,201 B1 | 10/2001 | Pivowar et al. | 709/214 |
| 6,334,126 B1 | 12/2001 | Nagatomo et al. | 707/4 |
| 6,337,858 B1 | 1/2002 | Petty et al. | 370/356 |
| 6,359,892 B1 | 3/2002 | Szlam et al. | 370/401 |
| 6,377,944 B1 * | 4/2002 | Busey et al. | 707/3 |
| 6,385,308 B1 | 5/2002 | Cohen et al. | 379/88.23 |
| 6,400,804 B1 * | 6/2002 | Bilder | 379/76 |
| 6,404,764 B1 | 6/2002 | Jones et al. | 370/352 |
| 6,411,965 B2 | 6/2002 | Klug | 707/201 |
| 6,414,962 B1 | 7/2002 | Hall et al. | 370/401 |
| 6,418,198 B2 | 7/2002 | Brablec et al. | 379/79 |
| 6,430,282 B1 * | 8/2002 | Bannister et al. | 379/211.02 |
| 6,445,697 B1 | 9/2002 | Fenton | 370/357 |
| 6,448,978 B1 | 9/2002 | Salvador et al. | 345/741 |
| 6,456,594 B1 | 9/2002 | Kaplan et al. | 370/238 |
| 6,456,601 B1 | 9/2002 | Kozdon et al. | 370/259 |
| 6,477,565 B1 | 11/2002 | Daswani et al. | 709/217 |
| 6,477,576 B2 | 11/2002 | Angwin et al. | 709/226 |
| 6,483,902 B1 | 11/2002 | Stewart et al. | 379/90.01 |
| 6,493,338 B1 | 12/2002 | Preston et al. | 370/352 |
| 6,496,477 B1 | 12/2002 | Perkins et al. | 370/228 |
| 6,526,462 B1 | 2/2003 | Elabd | 710/242 |
| 6,539,359 B1 | 3/2003 | Ladd et al. | 704/275 |
| 2001/0022784 A1 | 9/2001 | Menon et al. | 370/352 |
| 2001/0030950 A1 | 10/2001 | Chen et al. | 370/329 |

FOREIGN PATENT DOCUMENTS

| | | |
|---|---|---|
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

U.S. Appl. No. 09/515,797, filed Feb. 29, 2000, Guido M. Schuster et al.

U.S. Appl. No. 09/515,364, filed Feb. 29, 2000, Guido M. Schuster et al.

U.S. Appl. No. 09/405,283, filed Feb. 27, 1999, Guido M. Schuster et al.

U.S. Appl. No. 09/515,798, filed Feb. 29, 2000, Guido M. Schuster et al.

U.S. Appl. No. 09/584,924, filed May 31, 2000, Guido M. Schuster et al.

U.S. Appl. No. 09/515,969, filed Feb. 29, 2000, Guido M. Schuster et al.

U.S. Appl. No. 09/406,322, filed Sep. 27, 1999, Guido M. Schuster et al.

U.S. Appl. No. 09/406,152, filed Sep. 27, 1999, Guido M. Schuster et al.

U.S. Appl. No. 09/405,981, filed Sep. 27, 1999, Guido M. Schuster et al.

U.S. Appl. No. 09/406,128, filed Sep. 27, 1999, Guido M. Schuster et al.

U.S. Appl. No. 09/515,387, filed Feb. 29, 2000, Guido M. Schuster et al.

U.S. Appl. No. 09/515,970, filed Feb. 29, 2000, Guido M. Schuster et al.

U.S. Appl. No. 09/515,796, filed Feb. 29, 2000, Guido M. Schuster et al.

U.S. Appl. No. 09/406,151, filed Sep. 27, 1999, Guido M. Schuster et al.

U.S. Appl. No. 09/406,298, filed Sep. 27, 1999, Guido M. Schuster et al.

U.S. Appl. No. 09/406,066, filed Sep. 27, 1999, Guido M. Schuster et al.

U.S. Appl. No. 09/515,795, filed Feb. 29, 2000, Guido M. Schuster et al.

U.S. Appl. No. 09/516,269, filed Feb. 29, 2000, Guido M. Schuster et al.

U.S. Appl. No. 09/515,366, filed Feb. 29, 2000, Guido M. Schuster et al.

U.S. Appl. No. 09/470,879, filed Dec. 22, 1999, Guido M. Schuster et al.

U.S. Appl. No. 09/707,708, filed Nov. 7, 2000, Guido M. Schuster et al.

U.S. Appl. No. 09/677,077, filed Sep. 29, 2000, Guido M. Schuster et al.

U.S. Appl. No. 09/584,927, filed May 31, 2000, Guido M. Schuster et al.

U.S. Appl. No. 09/726,993, filed Nov. 30, 2000, Guido M. Schuster et al.

U.S. Appl. No. 09/728,833, filed Nov. 30, 2000, Guido M. Schuster et al.

3COM SIP Solutions 1.0 benefits brochure. ( 4 total pages).

Sidhu, Ikhlaq and Bezaitis, Andrew, Eat or be eaten, www.americasnetwork.com/issues/99issues/991101/991191_eat.htm, printed May, 10, 2000. (6 total pages).

Myers, Brad A.; Stiel, Herb: and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Cell Screening in a SIP–Based IP Telephony System, *IEEE Communications Magazine,* vol. 37, No. 7, Jul. 1999, pp. 96–101. (8 total pages).

Handley/Schulzrinne/Schooler/Rosenberg, SIP: Session Initiation Protocol. Network Working Group, Request for Comments (RFC) 2543, Mar. 1999, (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000, (131 pages).

International Search Report for PCT Application Serial No. PCT/US00/26618, Dated Feb. 19, 2001.

Pepper, David J. et al., *The Call Manager System: A Platform for Intelligent Telecommunications Services,* Speech Communication, vol. 23, (1997), pp. 129–139.

Dalgic, Ismail et al, *True Number Portability and Advanced Call Screening in a SIP–Based IP Telephony System,* IEEE Communications Magazine, vol. 37, No. 7, (Jul. 1999), pp. 96–101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON–Brain Pad,* Proceedings 13$^{th}$ Tron Project International Symposium, Online!, (Dec. 4–7, 1996), pp. 95–103.

Gessler, Stefan et al., *PDAs as Mobile WWW Browsers,* Computer Networks and ISDN Systems, vol. 28, No. 1, (Dec. 1995), pps. 53–59.

International Search Report for PCT Application Serial No. PCT/US00/26650, Dated Feb. 19, 2001.

International Search Report for PCT Applications Serial No. PCT/US00/41020, Dated Feb. 21, 2001.

Anquetil, L.P. et al., *Media Gateway Control Protocol and Voice Over IP Gateways, MGCP and VoIP Gateways Will Offer Seamless Interworking of New VoIP Networks with Today's Telephone Networks,* Electrical Communication, (Apr. 1, 1999), pps. 151–157.

International Search Report for PCT Application Serial No. PCT/US00/26649, Dated Feb. 6, 2001.

Zellweger, Polle T. et al. *An Overview of the Etherphone System and Its Applications,* Xerox Palo Alto Research Center (Mar. 1988), pps. 160–168, XP 000617541.

Terry, Douglas B. et al. *Managing Stored Voice In the Etherphone System,* Xerox Palo Alto Research Center vol. 1, (Feb. 1998), pps. 3–27, XP 000032477.

Terry, Douglas B. et al. *Managing Stored Voice In the Etherphone System,* Operating Systems Review (SIGOPS) US. ACM Head Quarter, New York, NY. vol. 21, No. % (Nov. 8, 1987), pps.103–104, XP 000005196.

* cited by examiner

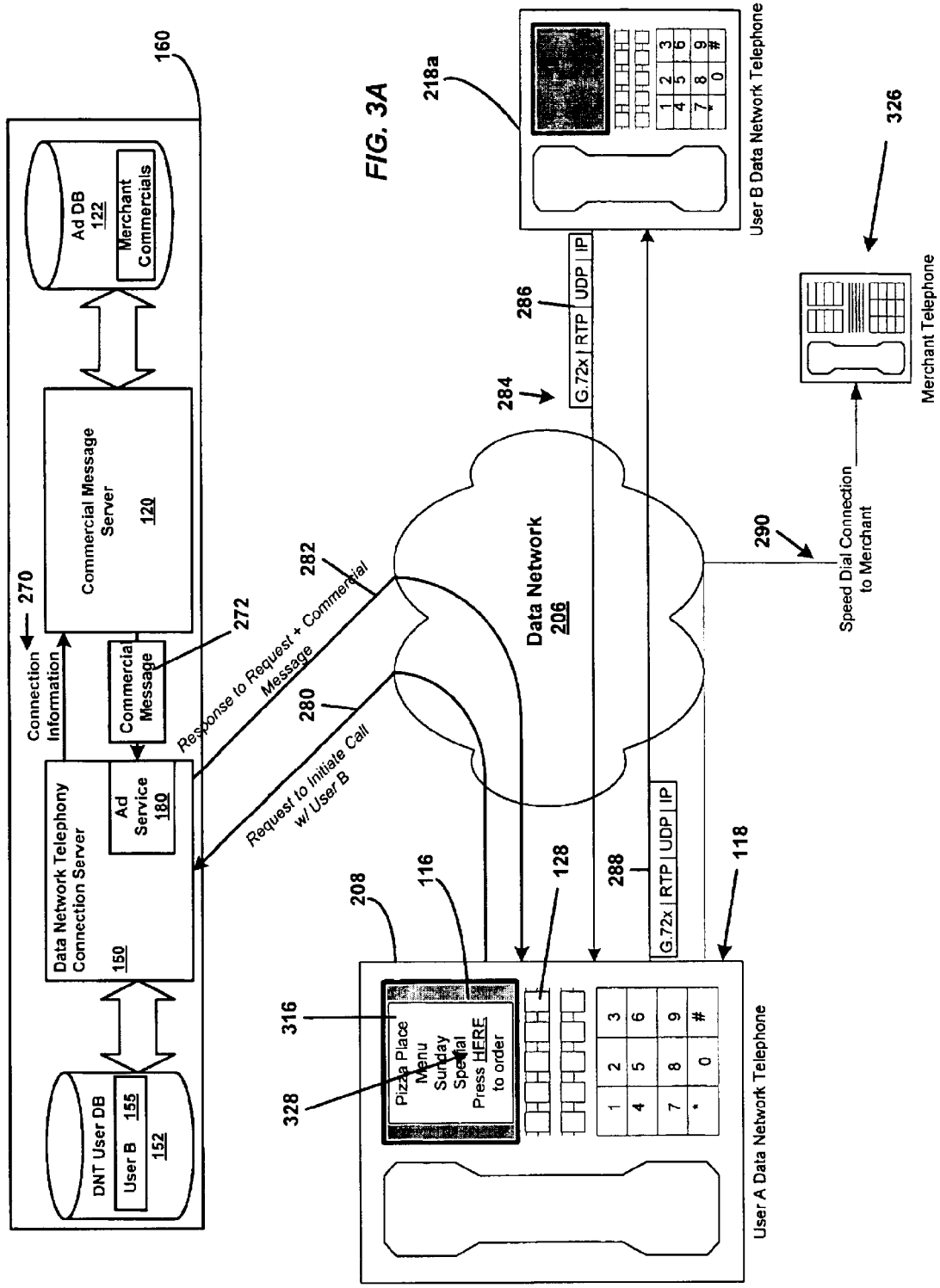

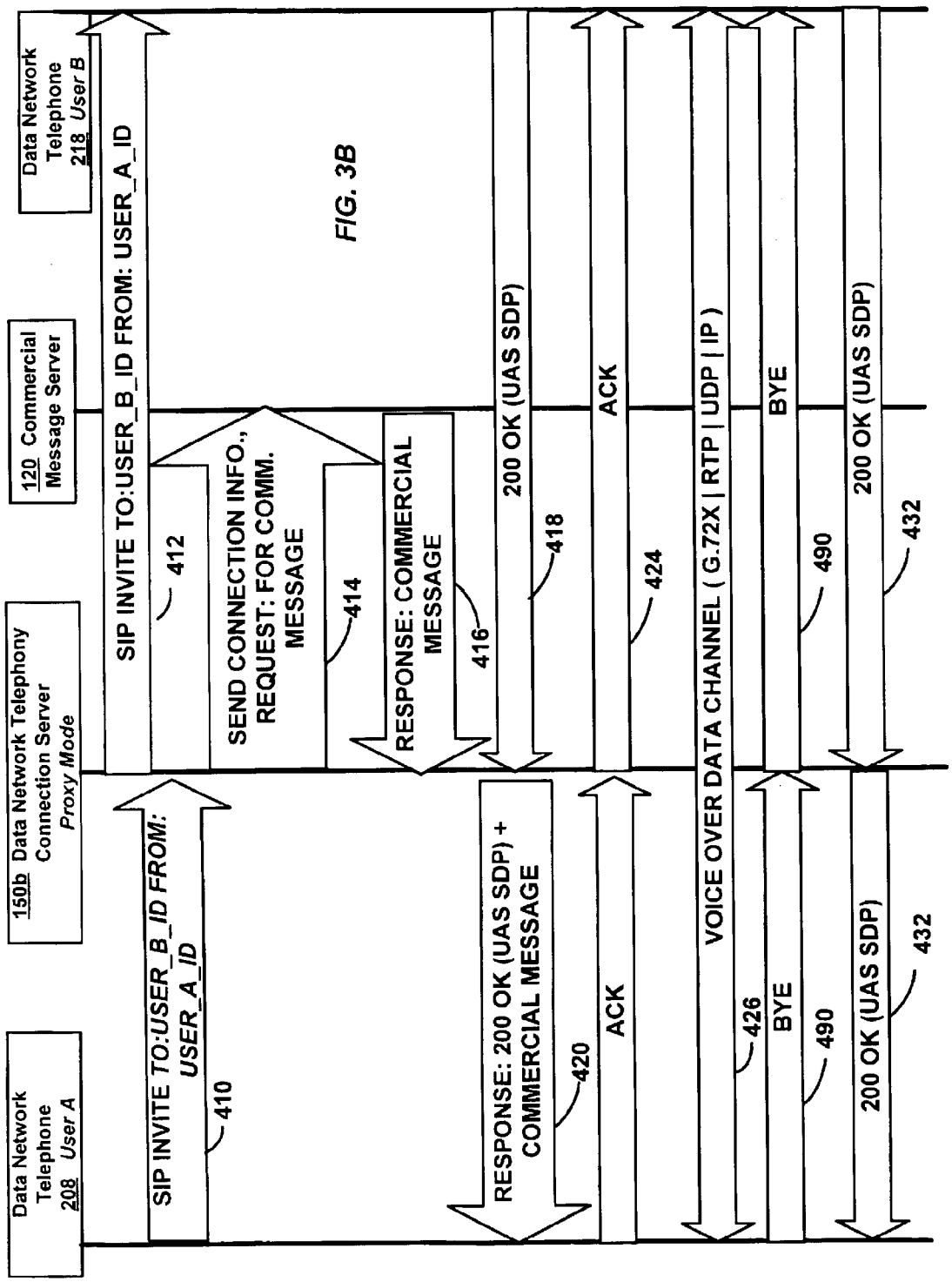

SYSTEM AND METHOD FOR ADVERTISING USING DATA NETWORK TELEPHONE CONNECTIONS

BACKGROUND OF THE INVENTION

A. Field of the Invention

The present invention is related to a method and system for providing communication services over a network. In particular, the present invention relates to a system and method for providing advertisement services over a telephony network.

B. Description of the Related Art and Advantages of the Present Invention

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more well-known CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System 7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers. For example, advertising may generate revenue and provide opportunities.

The present invention addresses the above needs by providing a system in a data network telephony system, such as for example, the Internet, that provides advertising service capabilities. Users may receive information relating to new opportunities and to products and services via the telephone. A telephony service provider may generate additional revenues by selling advertising services to merchants. New business opportunities may open to data network service providers to sell advertisement services. Merchants may also configure a system to generate their own advertising without having to purchase the service from an advertisement agency.

SUMMARY OF THE INVENTION

In a first aspect, a system is provided for advertising on a data network telephony system. The data network telephony system uses a data network that provides data connectivity for a plurality of data communications channels using data transport protocols to deliver telephony services. A commercial message server is connected to the data network to send at least one commercial message to users of the data network telephony system. First and second data network telephones are connected to the data network to communicate voice signals as data packets on a voice over data channel. The voice over data channel is a data communications channel containing packetized voice signals that may be communicated on the data network.

The first data network telephone receives the commercial messages. The first data network telephone also includes a message display device to display the commercial messages.

In another aspect of the present invention, a method for advertising on a telephony system is provided. In accordance with the method, a request is sent to initiate a telephone call between a first data network telephone and a second data network telephone over a data network. The first and second data network telephones have a display screen. The request contains a caller user identifier to identify a first user of the first data network telephone, and a callee user identifier to identify a user of the second data network telephone. The request to initiate is received at a connection server. At least one commercial message is retrieved from a commercial message server. The at least one commercial message is sent to the first data network telephone. The at least one commercial message is displayed on the display screen of the first data network telephone.

In another aspect of the present invention, a method of providing advertising services is provided. At least one merchant commercial message is stored in a commercial message database. A communication is established with a telephony service provider to receive connection information. The connection information including at least a user identifier corresponding to a user of a data network telephone is received. At least one commercial message is then sent to the data network telephone and the commercial message is displayed at the data network telephone.

In another aspect of the present invention, a voice communications device is provided. The voice communications device includes a network interface to communicate using at least one data communications channel over a data network. The data communications channel includes at least one voice over data communications channel. A voice over data processor converts voice signals to voice over data signals and voice over data signals to voice signals. The voice over data signals are communicated on the voice over data communications channel. A signaling stack sends a request to initiate a telephone call. The signaling stack also sends a response to a received request to initiate a telephone call from another voice communications device. A message display device displays at least one commercial message received over the data network.

In another aspect of the present invention, a commercial message server is provided. The commercial message server includes at least one commercial message for display on a voice communications device. A telephony connection server interface to receive a connection information from a telephony connection server. The connection information includes at least one user identifier for at least one party to a telephone call. The commercial message server sends the commercial message to the party identified by the user identifier.

In another aspect of the present invention, a telephony connection server is provided having a call management function operable to receive a request to initiate a telephone call using at least one voice communications device. The call management function also sends a response message in response to the request message. A network telephony user database stores a user identifier for each of a plurality of users. The user identifier includes a first sequence of alphanumeric elements that identify a user of a voice communications device. An advertisement service is provided to retrieve at least one commercial message from a commercial message server. The commercial message is communicated to the voice communications device.

These and other features and advantages of the present invention will become more apparent from the following detailed description of preferred embodiments of the present invention.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 3A is a block diagram showing the interaction between components in accordance with an example of a system and method for advertising using the data network telephony system in FIG. 2A;

FIG. 3B is a block diagram showing the message flow in the embodiment shown in FIG. 3A;

DETAILED DESCRIPTION OF THE PREFERRED EMBODIMENT

The following references to patent applications filed concurrently herewith are incorporated be reference:

"System and Method for Controlling Telephone Service Using a Wireless Personal Information Device" to Schuster, et al.

"System and Method for Providing User-Configured Telephone Service in a Data Network Telephony System" to Sidhu, et al.

"System and Method for Accessing a Network Server Using a Portable Information Device Through a Network Based Telecommunication System" to Schuster, et al.

"System and Method for Interconnecting Portable Information Devices Through a Network Based Telecommunication System" to Schuster, et al.

"System and Method for Enabling Encryption on a Telephony Network" to Schuster, et al.

"System and Method for Using a Portable Information Device to Establish a Conference Call on a Telephony Network" to Schuster, et al.

"System and Method for Associating Notes with a Portable Information Device on a Network Telephony Call" to Schuster, et al.

"System and Method for Providing Shared Workspace Services Over a Telephony Network" to Schuster, et al.

"System and Method for Providing Service Provider Configurations for Telephones in a Data Network Telephony System" to Schuster, et al. The following additional references are also incorporated by reference herein:

"Multiple ISP Support for Data Over Cable Networks" to Ali Akgun, et al.

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313

A. Data Network Telephony System

Figure 1:
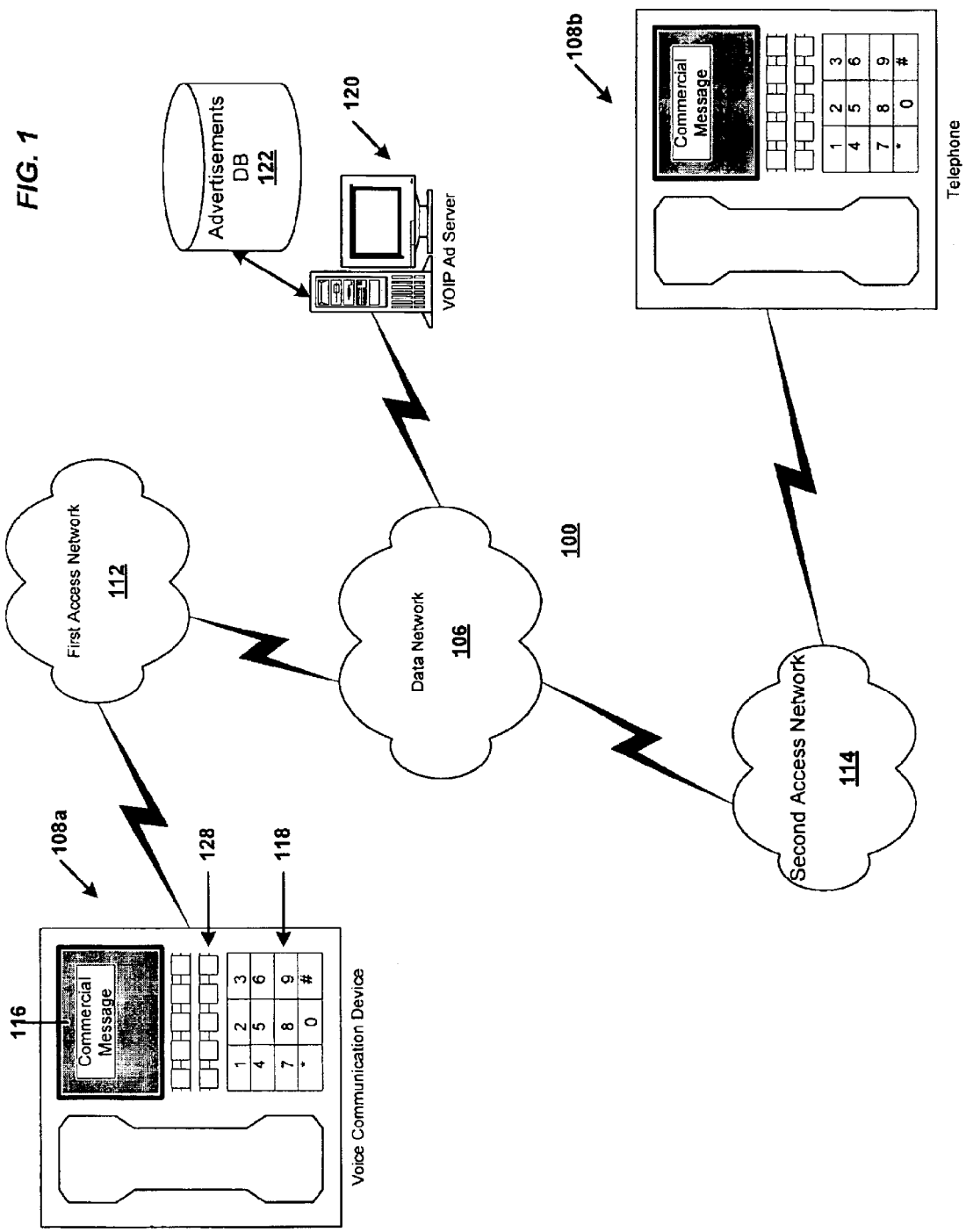
FIG. 1 is block diagram of a data network telephony system for providing advertising services in accordance with embodiments of the present invention.

FIG. 1 is a block diagram showing an example of a system 100 for providing advertisement services according to the present invention. The system includes a data network 106. A first voice communication device 108a may communicate by a voice connection over the data network 106 by establishing the connection via first access network 112. The voice connection may be linked to a second voice communication device 108b which is accessed via a second access network 114.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office.

The first and second voice communication devices 108a and 108b typically include a voice input, a voice output and a voice processing system (described further below with reference to FIG. 2B). The voice processing system converts voice sound from the voice input to digital data signals that are communicated on a voice connection over the data network. The voice processing system also converts digital data signals received from the voice connection to voice sound at the voice output. The voice communication devices 108a and 108b typically include a central processing unit and memory to store and process computer programs. Each voice communication device 108a and 108b typically includes a unique network address, such as an IP address, in memory to uniquely identify it to data network 106 and permit data packets to be routed to the device.

In one embodiment, the voice communication device 108a includes a handset with a receiver and transmitter similar or identical to handsets of traditional circuit-switched telephones. A console on which the handset sits may include the voice processing system, a display 116 and a keypad 118. The voice communication device 108a may also include a speed dial key set 128 programmed, or assigned to initiate connections to other voice communication devices that may be connected to the data network 106. In a preferred embodiment, the keys on the speed dial key set 128 may be programmed remotely by a message carried on a voice connection using a selected data transport protocol.

One example of the voice communication device 108a in a preferred embodiment is the NBX 100™ communication system phones offered by 3Com® Corporation, that has been modified, as described herein, to perform speed dial programming. In alternative embodiments, the voice communication device 108a may include any device having voice communications capabilities. For example, a personal computer having a microphone input and speaker output may also be used as the voice communication device 108a. Other configurations for the user interface are also intended to be within the scope of the present invention.

The details relating to operation of the voice communication devices 108a and 108b depend on the nature of the data network 106 and the nature of the access networks 112, 114 connecting the voice communication devices 108a and 108b to each other and/or to other network entities. The access networks 112, 114 typically include any high-bandwidth network adapted for data communications, i.e. a network having a bandwidth greater than 64,000 bits-per-second (bps). The access networks 112, 114 may link to the voice communication device 108a using an Ethernet LAN, a token ring LAN, a coaxial cable links (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112, 114 may also include the PSTN and link the voice communications device 108a by an analog modem. Further details regarding specific implementations are described below, with reference to FIGS. 2A and 2B.

B. System For Providing Advertising Services Using A Data Network Telephony System One advantage of the data network telephony system 100 in FIG. 1 is that it may be used to provide merchants with a medium for advertisement of products and/or services. Another advantage of the system 100 is that the medium may be made interactive to provide users with an easy way of accessing or contacting the merchant for information or purchase of the products and/or services.

A commercial message server 120, connected to the data network 106, transports commercial messages to voice communications devices 108a, 108b. The commercials are stored in a commercial message database 122. During a voice connection to which, for example, voice communication device 108a is a party, the commercial message server 120 may provide commercial messages for transport to the voice communication device 108a. The commercial messages may be received at the voice communication device 108a and displayed on the display 116. The commercial messages may include image and text that advertise for a merchant. The commercial messages may also include speed dial messages that may program a speed dial key to initiate a connection to the merchant when pressed.

The commercial message server 120 is shown coupled to data network 106, but may also be coupled to the first or second access networks 112 and 114. An advertisement database 122 may be included with the commercial message server 120 to maintain commercial messages.

The commercial message server 120 may be used by a telephony service provider to offer advertisement for revenue services to merchants. The merchants may be subscribers of telephony services from the service provider and use advertisement services as an option. Advertisements that a merchant may want to have transported for display on voice communication devices may be stored in the advertisement database.

The commercial message server 120 and data base 122 may be used by a data services provider (such as an Internet Service Provider, or ISP) to download messages on voice connections to the voice communication devices 108. The ISP may receive connection information from the telephony service provider and use the connection information to determine destination voice communication devices 108 to which to send advertisements. The advertisements may be sent as commercial messages that include speed dial messages.

1. Local Area Network As An Exemplary Access Network

Figure 2A:
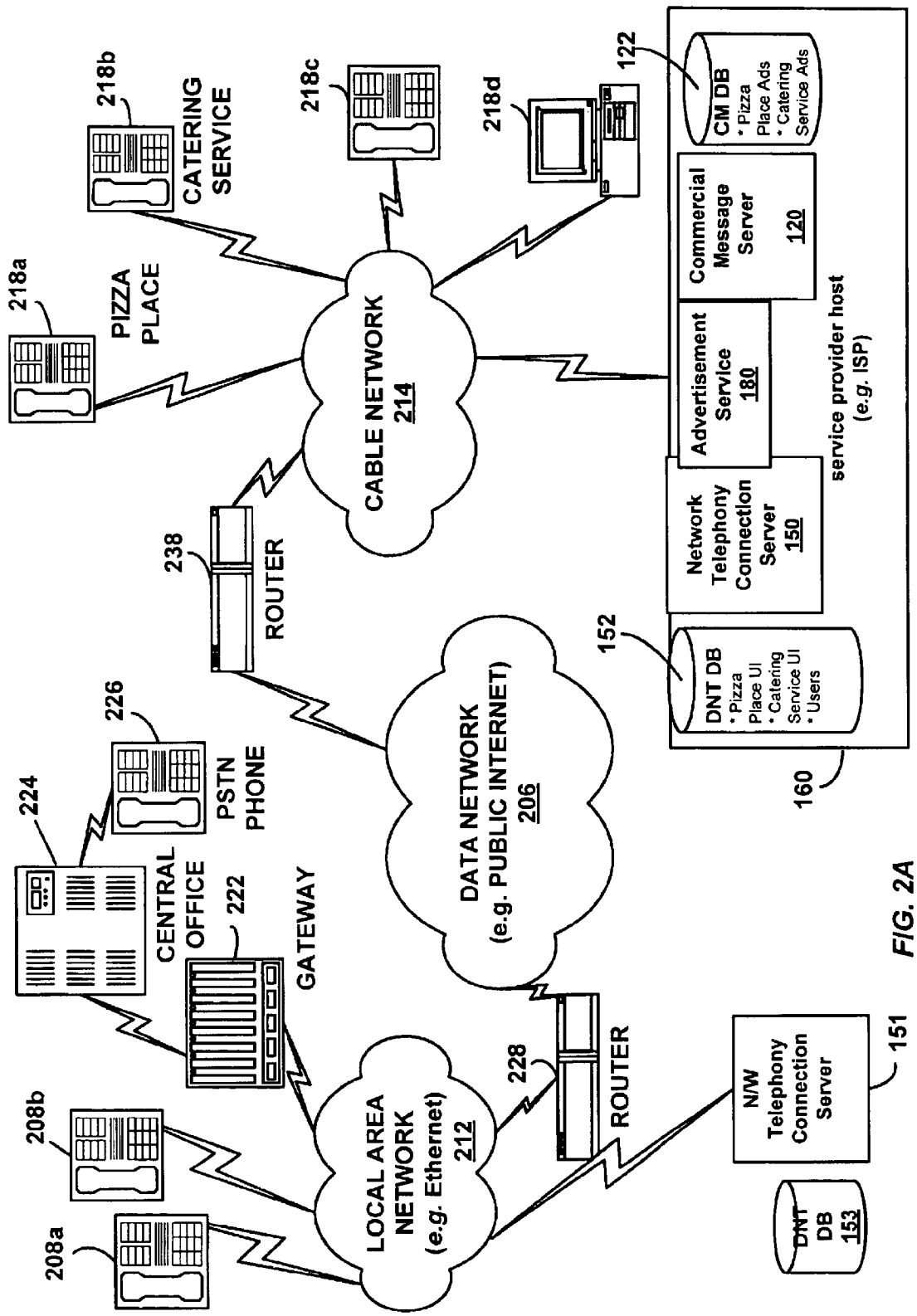
FIG. 2A shows one embodiment of the system of FIG. 1.

FIG. 2A is a block diagram showing one example of the system 100 of FIG. 1 for providing customized communication services according to the present invention. The system 200 in FIG. 2A includes a local area network 212, connected to a data network 206 by a first router 228 and a cable network 214 connected to the data network 206 by a second router 238. Those of ordinary skill in the art will appreciate that, while the local area network 212 and the cable network 214 are shown in FIG. 2A as access networks, any other type of network may be used. For example, the local area network 212 and/or the cable network 214 may be replaced by ISDN, DSL, or any other high-speed data link.

The local area network 212 provides data connectivity to its members, such as a first data network telephone 208a, a second data network telephone 208b, a gateway 222 and a network telephony connection server 150. The local area network 212 in FIG. 2A is an Ethernet LAN operating according to the IEEE 802.3 specification, which is incorporated by reference herein, however, any other type of local area network may be used. The local area network 212 uses the router 228 to provide the data network telephone 208a,b, the gateway 222 and the network telephony connection server 150 with access to the data network 206. For example, the router 228 may perform routing functions using protocol stacks that include the Internet Protocol and other protocols for communicating on the Internet.

The network telephony connection server 151 (hereinafter "telephony connection server") provides telephony registration, location and call initiation services for voice connections in which its members are a party. A user may register for telephony service with an administrator of the telephony connection server 151 and receive a user identifier and a telephone identifier. The user identifier and telephone identifier may be sequences of unique alphanumeric elements that callers use to direct voice connections to the user. The telephony connection server 151 registers users by storing user records in a data network telephony user database (hereinafter "user database") 153 in response to registration requests made by the user.

The call setup process and the user and telephone identifiers preferably conform to requirements defined in a call management protocol. The call management is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2A is the Session Initiation Protocol (SIP), which is described in M. Handley et al., "SIP: Session Initiation Protocol," IETF RFC 2543, Mar. 1999, incorporated by reference herein, however, any other such protocol may be used. Other protocols include H.323, the Media Gateway Control Protocol (MGCP), etc.

The local area network 206 is connected to a gateway 222. The gateway 322 communicates with a PSTN central office 224, which provides PSTN service to a PSTN phone 226. The PSTN phone 226 is likely to be one of many PSTN phones serviced by the central office 224. Additional portions of a PSTN network have been omitted from FIG. 2A to improve clarity. The PSTN network is well known by those having skill in the art of telecommunications.

The telephony connection server 151 provides telephony service for mobile users. A user may be registered to use the first network telephone 208a (which is identified by its telephone identifier), but move to a location near the second data network telephone 208b. The user may re-register as the user of the second data network telephone 208b. Calls that identify the user by the user's user identifier may reach the user at the second network telephone 208b.

2. The Data Network Telephones

The data network telephones 208a, b are Ethernet phones which are telephones that include an Ethernet communications interface for connection to an Ethernet port. The Ethernet phones in FIG. 2A support the Internet Protocol (IP), using an IP address that is either statically configured or obtained by access to a Dynamic Host Configuration Protocol (DHCP) server.

Figure 2B:
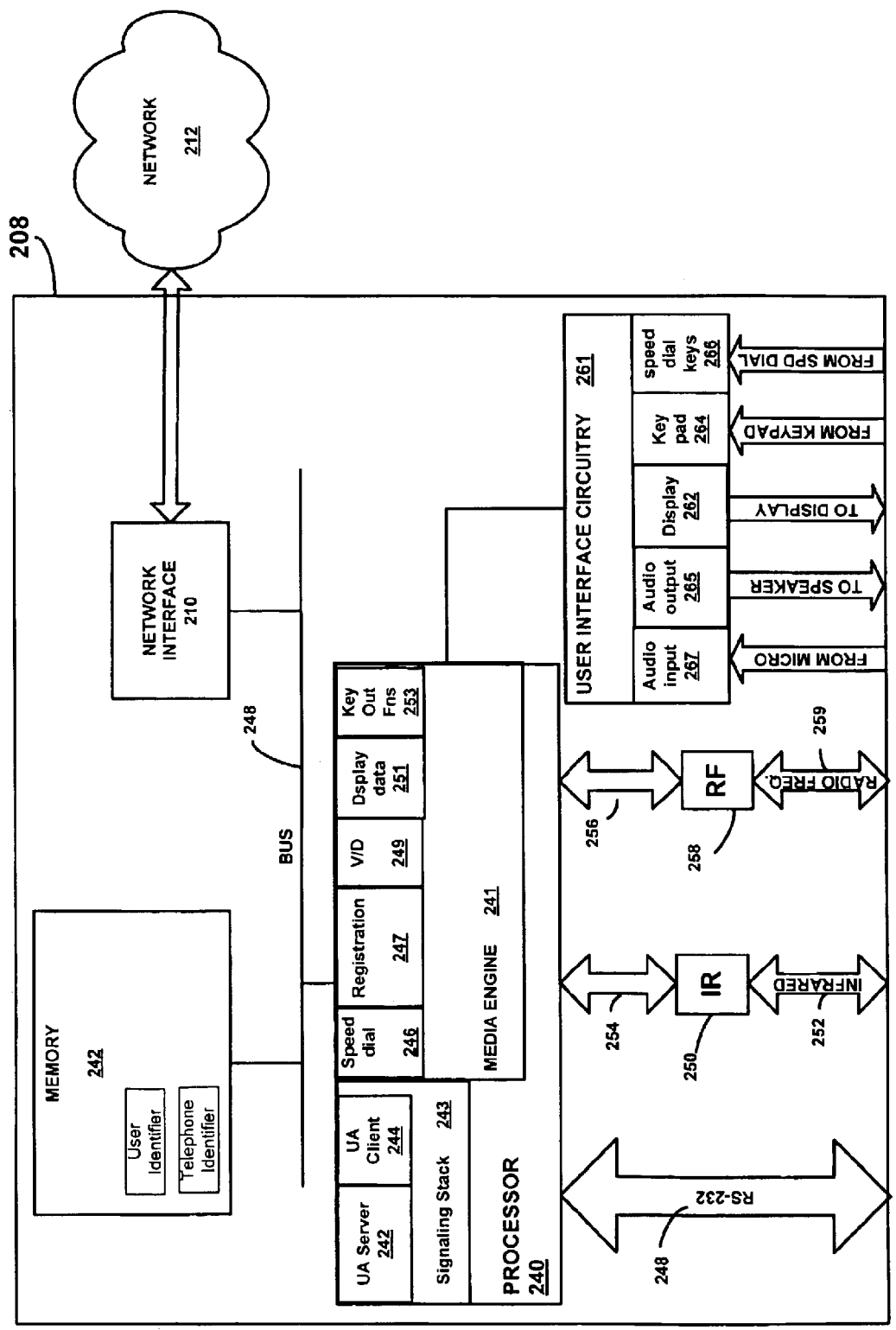
FIG. 2B shows one example of one of the data network telephones in FIG. 2A.

FIG. 2B is a block diagram showing the data network telephone 208a connected to the local area network 212 in FIG. 2A. The data network telephone 208 in FIG. 2B is connected to the network 212 by a network interface 210. The network interface 210 may, for example, be a network interface card, and may be in the form of an integrated circuit. A bus 248 may be used to connect the network interface 210 with a processor 240 and a memory 242. Also connected to the processor are user interface circuitry 261 and three alternative (and all optional) interfaces to a Personal Information Device (PID).

A first interface 248 includes an RS-232 serial connection and associated coupling hardware and mechanisms. The first alternative interface 248 may, for example, be a docking cradle for a PDA, in which information can be transferred between the PDA and the data network telephone 208. The second alternative interface comprises a first connection 254, such as an RS-232 connection, along with infrared circuitry 250 for converting signals into infrared output and for accepting infrared input. An infrared interface 252 may also be included within the second alternative interface. The third alternative interface comprises a first connection 256, such as an RS-232 connection, along with radio-frequency circuitry 258 for converting signals into radio frequency output and for accepting radio frequency input. A radio frequency interface 259 may also be included as part of the third alternative interface.

The three alternative interfaces described above are merely examples, and additional means for implementing the interface between the data network telephone 208 and the PID may also be used. Although three interfaces are shown in FIG. 2B, there may be only one such interface in the data network telephone 208. More than one interface may be included to improve flexibility and to provide redundancy in case of failure of an interface.

The user interface circuitry 261 includes hardware and software components that access the fictions of the handset, display, keypad and speed dial keypad to provide user input and output resources for functions in the processor 240. The user interface circuitry includes a display interface 262, a keypad interface 264, a speed dial interface 266, an audio output interface 265 and an audio input interface 267.

The audio input interface 267 may receive voice signals from a microphone or other audio input device and converts the signals to digital information. The conversion preferably conforms to the G.711 ITU Standard. Further processing of the digital signal may be performed in the audio input interface 267, such as to provide compression (e.g. using G.723.1 standard) or to provide noise reduction, although such processing may also be performed in the processor 240. Alternatively, the audio input interface 267 may communicate an analog voice signal to the processor 240 for conversion to digital information.

The audio output interface 265 receives digital information representing voice from the processor 240 and converts the information to sound. In one embodiment, the speaker interface receives information in the form of G.711 although other processing such as decompression may be performed in the speaker interface 265. Alternatively, the processor 240 may convert digital information to analog voice signals and communicate the analog voice signals to the speaker interface 265.

The speed dial interface 266, the keypad interface 264 and the display interface 262 include well-known device interfaces and respective signal processing techniques. The speed dial interface 266 may include an interface to buttons on a keypad, or to display buttons that the user activates by pressing designated areas on the screen.

The user interface circuitry 261 may support other hardware and software interfaces. For example, a videophone implementation might also include a camera and monitor. The voice communication device of the present invention is not limited to telephones or videophones—additional user interface types are also contemplated as being within the scope of the present invention.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also includes operating system, application and communications software to perform the functions of the data network telephone 208. The operating system may be any suitable commercially available embedded or disk-based operating system, or any proprietary operating system.

The processor 240 includes a media engine 241 and a signaling stack 243 to perform the primary communications and applications functions of the data network telephone 208. The purpose of the signaling stack in an exemplary data network telephone 208 is to set up, manage, and tear down a call. During the setup phase, a user may use the keypad to enter a user identifier to call. The signaling stack 243 receives the user entry and formats a request message to send to the user identified by the user identifier to initiate a telephone call. When the request message is sent, the location of the user identified by the user identifier is discovered, and communication parameters, such as the supported voice CODEC types, are exchanged. A voice over data channel is established to carry the voice portion of the communication. During the management phase, the voice over data channel is used, the CODEC types may be changed, and other parties are invited to the call if needed. During the teardown phase, the call is terminated.

The signaling protocol used in the data network telephone 208 in FIG. 2B is the SIP protocol. In particular, the signaling stack implements a User Agent Client 244 and a User Agent Server 242, in accordance with the SIP protocol. Alternative signaling protocols, such as the ITU-T H.323 protocol and others, may also be used to implement the present invention.

Once the call is setup, the media engine 241 manages the communication over a data communications channel using a network transport protocol and the network interface 210. The media engine 241 sends and receives data packets having a data payload for carrying data and an indication of the type of data is being transported. The media engine 241 in the data network telephones 208 may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter.

The media engine 241 includes hardware and software components for performing speed dial functions 246, registration functions 147, voice-over-data functions 249, display data function 251 and keypad output functions 253. The media engine 241 processes data that is received from the network 212, and data that is to be sent over the network 241.

For data that is received from the network 212, the media engine 241 may determine from the type of data in the packet whether packets contain sampled voice signals or data for performing other functions. Packets containing sampled voice signals are processed by voice over data function 249. The voice over data function 249 preferably conforms to a protocol for formatting voice signals as digital data streams. While any suitable protocol may be used, the media (voice signal) is preferably transported via the Real Time Protocol (RTP), which itself is carried inside of User Datagram Protocol (UDP). RTP is described in H. Schulzrinne et al., "RTP: A Transport Protocol for Real-Time Applications," IETF RFC 1889, Jan. 1996, which is incorporated herein by reference. UDP is described in J. Postel, "User Datagram Protocol," IETF RFC 768, Aug. 1980, and IP is described in J. Postel, ed., "Internet Protocol," IETF RFC 791, Sep. 1981, both of which are incorporated by reference herein.

Packets containing data for use in registering the data network telephone 208 with a network telephony service are processed by the registration function 247. By registering the data network telephone 208, a user may establish with the network telephony service provider that calls addressed to the user's user identifier may be connected to the data network telephone 208. Registration may occur when the data network telephone 208 sends a request to register to a service provider host. The service provider host may respond by setting the user's user identifier to correspond to the telephone identifier of the data network telephone 208, and by acknowledging the request with a status message to the data network telephone 208. In one embodiment, a request to register the data network telephone 208 to a default user is automatically sent during power-up of the data network telephone 208.

Other features may be added to the registration functions 247, or implemented as extensions to the registration functions 247. For example, the data network telephone 208 may be provisioned to provide selected network telephony services by establishing a data connection with a service provider, requesting the selected services, and receiving data that ensures that the services have been successfully provisioned. Such services may include, for example, caller identification, call forwarding, voice mail and any other service offered by the network telephony service provider to enhance the capabilities of the data network telephone 208. One advantage of such provisioning functions is that services may be ordered for temporary use in a manner that is convenient to the user.

Packets containing data that is to be displayed on the display device are processed by the display data function 251. The display data function 251 may be used for displaying, for example, the name(s) and user identifier(s) of the other party(-ies) to the call, the status of the telephone call, billing information, and other information. The display data function 251 may also provide access to the display interface 262 for the display of commercial messages sent from the commercial message server 120 (shown in FIG. 2A). The display data function 251 may process image data and text data that may be contained in the commercial messages.

Packets containing data that programs or assigns speed dial keys are processed by the speed dial function 246. When a commercial message is received, the data in the commercial message is examined for speed dial programming data. The speed dial programming data may include a speed dial key selector to identify the speed dial key being programmed, and a user identifier used to initiate a telephone call when the selected speed dial key is pressed. The speed dial programming data may also include directions to be displayed on the display screen that inform the user that a selected speed dial key has been programmed. In addition, the speed dial programming data may include an icon for display on a touch sensitive screen that describes the user or service to be reached when the icon on the display is touched.

The speed dial programming data may also include an indication of whether the speed dial key is to be programmed permanently, or temporarily. Temporarily programmed keys may be programmed for the duration of the present call only, or for a selected time period. Permanently programmed speed dial keys are programmed until re-programmed later.

For data that is to be sent over the data network 212, the media engine 241 formats the data as data packets in accordance with a selected protocol. The selected protocol is preferably the protocol that is supported by the data network telephone that will receive the data for the particular type of data being transported.

The voice over data function 249 formats voice samples according to the protocol used by the receiving data network telephone. In one preferred embodiment, the voice over data function 249 formats voice samples as RTP packets. The registration function 247 and the keypad output function 253 may use RTP or other protocols to transport data that does not represent voice signals.

3. Cable Network As An Exemplary Access Network

Referring back to FIG. 2A, the system 200 includes a cable network 214 connected to the data network 206 by a router 238. The cable network 214 provides data network access to its members, which in FIG. 2A include a third data network telephone 218a, a fourth data network telephone 218b, a fifth data network telephone 218d, a workstation 218c and a service provider host 160. The users of the data network telephones 218a–c connected to the cable network 214 may communicate by telephone over the data network 206 with the users of the data network telephones 208a,b connected to the local area network 214.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

The cable network 214 includes high-frequency coaxial cable connections for terminating the members, such as the data network telephones 218a–c and the workstation 218d. The third, fourth and fifth data network telephones 218a–c are preferably similar to the data network telephone 208 described with reference to FIG. 2B. One difference is that the third, fourth and fifth data network telephones 218a–c access telephone service over the cable network 214, and the first and second data network telephones 208a,b access telephone service over the Ethernet.

4. Providing Telephony and Advertisement Services

The service provider host 160 may be used by the cable network service provider to provide various services such as, Internet access, telephony service and advertisement services. In order to provide such services, the service provider host 160 may include a telephony connection server 150 connected to a user database 152, an advertisement service 180, a commercial message server 120 and a commercial message database 122. The service provider host 160 of FIG. 2A is set up and managed by an Internet Service Provider (ISP).

The third data network telephone 218a and the fourth data network telephone 218b are shown in FIG. 2A as belonging to merchants. The third data network telephone 218a is the telephone in a Pizza Place and the fourth data network telephone 218b is the telephone in a catering service. The designations of these data network telephones 218a–c as belonging to merchants provides examples of the advantages of using embodiments of the present invention as discussed below.

In accordance with embodiments of the present invention, the ISP may offer the Pizza Place, the catering service and other merchants the data network 206 and data network telephones 208 et seq., 218 et seq. as a medium to advertise products and services. The ISP configures the commercial message server 120 and database 122 by storing commercial messages for subscribing merchants. As described below with reference to FIGS. 3 through 8, the advertisement service 180 manages access to the commercial messages to transport the messages to users at data network telephones. The commercial messages are displayed on the display of data network telephones that are parties to telephone calls having voice over data channels. The commercial messages may also include speed dial messages that assign the merchant's user identifier to a speed dial key on the data network telephone.

The telephony connection server 150 is preferably a SIP-based server that performs call initiation, maintenance and teardown for the data network telephones 218a–c connected to the cable network 214. The telephony connection server 150 may be similar or identical to the telephony connection server 150 connected to the local area network 212. The ISP host 160 may include the advertisement service 180 that manages the use of, or communication with, the commercial message server 120 and the commercial message database 122.

The system 200 shown in FIG. 2A includes a data network telephony system that permits the data network telephones 208a, b connected to the local area network 212 to communicate with the data network telephones 214 connected to the cable network 214. The system shown in FIG. 2A uses SIP in order to establish, maintain and teardown sessions, or telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the telephony connection server 150. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message.

Furthermore, proxies can either be forking or non-forking. A forking proxy can, for example, ring several phones at once until somebody takes the call. Registrar servers are used to record the SIP address (called a SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the network telephony server 150 is the primary destination of all SIP messages trying to establish a connection with users on the local area network 212. Preferably, the network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the user database 152. It allows all mobile clients to register with their current locations.

Similarly, the network telephony server 150 is the primary destination of all SIP messages trying to establish a connection with the data network telephones 218a–c connected to the cable network 214. Preferably, the network telephony server 150 is also the only destination advertised to the SIP clients outside the LAN 212 on behalf of all the SIP clients (e.g. data network telephones) residing on the LAN 212. The network telephony server 150 relays all SIP INVITE messages to the appropriate final destination (or another SIP proxy), based on a database lookup using the user database 152.

The data network telephones 208a,b and 218a–c in the system 200 preferably have pre-programmed device identifiers (e.g. phone numbers), represented as SIP-URL's that are of the form sip:8475551212@3com.com. After power-up, each data network telephones 208a,b and 218a–c sends a SIP REGISTER message to the default registrar, such as the network telephony servers 150. When a call arrives at one of the network telephony servers 150 for any of the registered SIP URLs, the server will forward the call to the appropriate destination. If a data network telephone is moved to a new location, all calls to the associated SIP URL will still be properly routed to that device. In other words, the system in FIG. 2A provides device mobility in the sense that calls will "follow" the data network telephone according to its SIP URL. This is especially useful if the data network telephone 208a,b or 218a–c is running the DHCP (Dynamic Host Configuration Protocol) so that when the location is changed, the IP address is also automatically changed.

An advantage of the system in FIG. 2A is that the advertisement service 180 may be used to provide merchants with a medium for advertisement. A further advantage of the system 200 is that the merchants may also provide their customers with a convenient way of accessing their products and/or services. Yet another advantage of the system 200 in FIG. 2A is the flexibility with which it may provide advertisement services. In addition to the alternative components that may be used in the system 200 (e.g. different types of networks as access networks, different data network telephones, etc.), different methods of providing advertisement may be used to support different features.

Embodiments of the present invention may be configured to support different enterprise models. For example, in one enterprise model, a service provider may provide a variety of services used in connection with the data network 206, such as data connectivity, telephony and advertisement services. In another enterprise model, service providers may be dedicated to specific areas, such that telephony services are provided by telephony service providers and advertisement services are provided by an advertising service provider. In another enterprise model, a merchant may establish a proprietary advertisement service to advertise his/her own products and/or services in accordance with embodiments of the present invention. The flexibility of the system 200 of FIG. 2A also permits different enterprise models to operate in the same system.

C. Providing Advertisement Services By A General Service Provider

1. General Service Provider

Figure 3C:
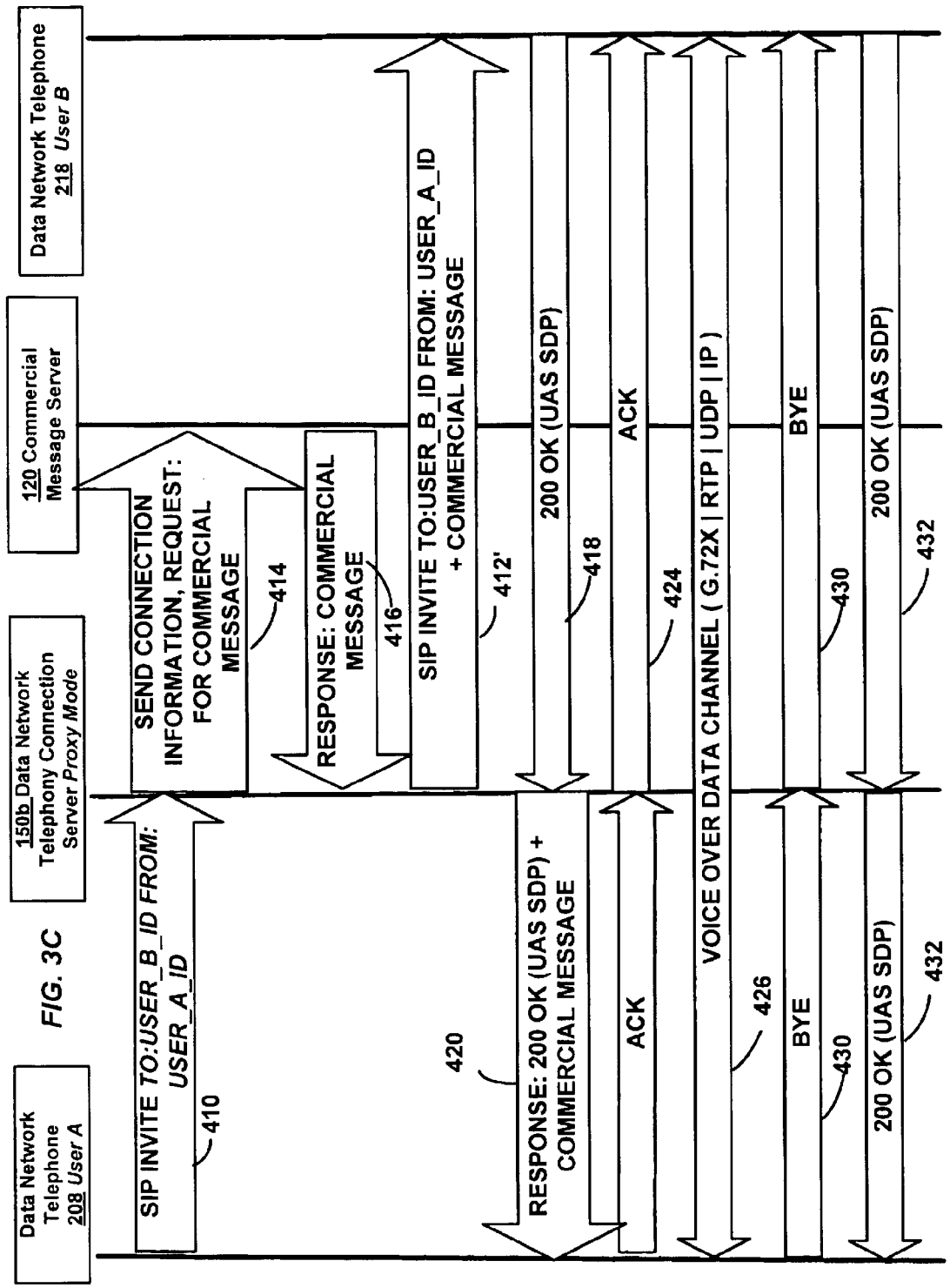
FIG. 3C is a block diagram showing an alternative embodiment to the message flow shown in FIG. 3B.

FIGS. 3–5 illustrate the interaction between the components in FIG. 2A for providing advertising services in a data network telephony system in accordance with exemplary embodiments of the present invention. In FIG. 3A, a general service provider (e.g. ISP) provides telephone service and advertising services using the host 160. The general service provider may also provide data connectivity services and other services relating to communication on the data network 206. User B registers his/her data network telephone 218 by a registration process in which a connection is made to store User B's registration information in the user database 152. User B's registration information may include at least:

(1) User identifier for User B: a sequence of alphanumeric elements that uniquely identifies User B. The user identifier may be formatted as an E.164 telephone number, or as a name. The user identifier may be unique throughout the universe of users on the data network telephony system 200 (shown in FIG. 1), or it may acquire such uniqueness by association with a server identifier.

(2) Telephone Identifier for User B's data network telephone 218: a sequence of alphanumeric elements that uniquely identifies User B. The user identifier may be formatted as an E. 164 telephone number, or as a number, such as a MAC address. It is preferable, however, that an alternative to the MAC address be used as the telephone identifier to permit actively assigning selected telephone identifiers. The telephone identifier may be unique throughout the universe of data network telephones on the data network telephony system 200, or it may acquire such uniqueness by association with a server identifier.

(3) User B's name, address and other information that may be used primarily for billing purposes. For example, User B's checking account number, credit card number or other financial information may be provided for automatic billing and payment capabilities.

(4) User B's telephony service features. User B may subscribe, permanently or temporarily, to one or more telephony service features offered by the service provider. For example, User B may subscribe to the following services:

a Voice mail b Caller ID c Call Forwarding with true number portability d Teleconferencing (5) Commercial messaging—a service that may be made available in embodiments of the present invention. A user may subscribe to have the data network telephone 218 receive (or not to receive) advertisements for display on the display of the data network telephone 218.

(6) Commercial messaging with speed dial programming—a service that may be made available in embodiments of the present invention. A user may subscribe to have the data network telephone 218 receive (or not to receive) advertisements that program the speed dial keys of the data network telephone 218.

Once User B completes the registration process with the service provider, the telephony connection server 150 stores User B's registration information 155 in the user database 152. The telephony connection server 150 then operates as a proxy server (e.g. as a SIP proxy server) for User B's data network telephone 218. When other users, such as User A, attempt to call User B. the call setup will be made through the telephony connection server 150.

The service provider at the host 160 may provide advertising services to merchants using the commercial message server 120. Merchants may subscribe to advertising services from the service provider providing opportunities for added revenues to the service provider. The merchants may obtain their own commercial messages, or they may work with the service provider to configure suitable commercial messages.

The commercial messages include image and/or text data composed as advertisements of the products and/or services of the subscriber merchants. The image and/or text data is transported to data network telephones 208,218 for display on the telephone display device 116. The commercial messages may also include speed dial messages that the data network telephones 208, 218 use to program speed dial keys 128, permanently or for a selected time interval. The commercial messages are stored in the commercial message database 122, which is managed by the commercial message server 120.

The host 160 includes the advertisement service 180, either telephony connection server 150 as shown in FIG. 3A or in another component of the host 160 that may not be shown. The advertisement service 180 includes functions for sending connection information 270 to the commercial message server 120, for retrieving commercial messages from the commercial message server 120, and for ensuring that the commercial messages are communicated to the data network telephones 208, 218.

2. Establishing A Telephone Call

As shown in FIG. 3A, User A initiates a telephone call from User A's data network telephone 208 to the data network telephone 218 belonging to User B. User A begins the telephone call by dialing User B's user identifier using the keypad 118. The data network telephone 208 sends a request to initiate a call to User B at 280 to the data network telephony connection 150 providing service to User B. The request to initiate a call to User B at 280 includes User B's user identifier as the callee, User A's user identifier as the caller and the protocols supported by User A's data network telephone 208.

The telephony connection server 150 sends the request to the data network telephone 218 identified in the user database 152 as belonging to User B, preferably, in accordance with its role as a proxy server, and preferably as defined in the SIP protocol. After receipt of the request, the telephony connection server 150 sends the connection information 270 to the commercial message server 120. The commercial message server 120 responds with a merchant's commercial message 272. For example, the connection information 270 may include the user identifier of User A. The commercial message server 120 may then determine that User B is a subscriber merchant and respond by sending User B's commercial messages.

The data network telephone 218 responds with a response message (not shown in FIG. 3A) to the telephony connection server 150. The telephony connection server 150 receives the response message and attaches the merchant's commercial message 272 received from the commercial message server 120 to the response message before sending the response message to User A's data network telephone 208 as shown at 282. In a preferred embodiment, the merchant's commercial message 272 may be inserted in the message body of the response to a REQUEST to INVITE message in accordance with the SIP protocol. Other ways of communicating the merchant's commercial message 272 as part of the response to a request to initiate a call may be used in accordance with alternative protocols.

User A's data network telephone 208 receives the response message and may prepare an acknowledgement message if called for by the protocol (e.g. the SIP protocol). The merchant's commercial message 272 is extracted from the message body of the response and displayed on the display 116 as a displayed commercial message 316. The displayed commercial message 316 may include a display button 328 (such as a hotlink or icon). When pressed, the display button 328 initiates a speed dial connection 290, at the termination of the present telephone call to the telephone identified in the display button 328. The speed dial display button 328 may also initiate the telephone call immediately because multiple communications channels may be established during a telephone call.

Alternatively, the merchant's commercial message 272 may include a speed dial message used by User A's data network telephone 208 to assign a user identifier or a telephone identifier to one or more of the speed dial keys 128. The speed dial message may include a time limit to limit the time of the assignment to a selected time interval or to the time of the present telephone call. Alternatively, the assignment may be permanent, or provisions may be made to indicate either a permanent or a temporary assignment. When User A presses the speed dial key 128 assigned by the speed dial message, the speed dial connection at 290 to the merchant is initiated, immediately or at the end of the present telephone call.

3. Voice Over Data Channel

User A's data network telephone 208 also establishes a voice over data channel 284 to permit communication between User A and User B. The voice over data channel 284 is preferably a data communications channel in which voice signals that have been converted to digital information are being carried as data messages in accordance with a selected protocol. The data messages include User B's message 286 and User A's messages 288 as shown in FIG. 3A. User B's message 286 and User A's message 288 both include an IP protocol component, a UDP component, an RTP component and a G.72x component.

The IP protocol component permits routing of the messages 286, 288 in accordance with an Internet Protocol (e.g. Ipv4, IPV6, etc.). The UDP component permits transport as a User Datagram in a connection-less environment in accordance with the User Datagram Protocol (UDP). The RTP component is the chosen format for communicating the voice signals as data. The G.72x component indicates how the voice signals, once extracted from the RTP component are to be processed to produce audio. The G.72x indication represents that the voice signals may conform to ITU-T Recommendation G.721, ITU-T Recommendation G. 722, ITU-T Recommendation G.723, ITU-T Recommendation G.723.1, ITU-T Recommendation G.728 or ITU-T Recommendation G.729. The voice signals may also conform to ITU-T Recommendation G.711 or to any other suitable protocol.

One of ordinary skill in the art will appreciate that the voice over data channel 284 may be implemented using different protocols than the ones shown in FIG. 3A. Moreover, when the signaling protocol used to establish the telephone call permits negotiation of supported protocols as is done with the preferred SIP protocol, the voice over data channel 284 may be asymmetrical; that is, User A's messages 288 may be different from User B's messages 286.

The telephone call carried out over the voice over data channel 284 proceeds until one or both users terminate the call. During termination or teardown of the call, the telephony connection server 150 performs in accordance with the selected session protocol such as the SIP protocol.

4. Message Flow

FIG. 3B shows an example of the message flow occurring in the communications described with reference to FIG. 3A using SIP as the call protocol. The SIP Invite message 410 in FIG. 3B from User A at the data network telephone 208 is the request to initiate a call at 280. The telephony connection server 150 sends the SIP Invite message 412 to the data network telephone 218 belonging to User B. Messages 414 and 416 in FIG. 3B, which are not SIP messages, are the connection information message 270 and the commercial message 272 in FIG. 3A, respectively. SIP Response message 418 is a response from the data network telephone 218 to the SIP Invite message 410, which is received at the telephony connection server 150.

The telephony connection server 150 inserts the commercial message 272 to the SIP response message and communicates it as a SIP Response message 420 to User A's data network telephone 208. User A's data network telephone 208 sends a SIP Ack message 424 to User B's data network telephone 424 to complete the initiation of the telephone call.

The voice over data channel 284 in FIG. 3A is shown in FIG. 3B as a voice over data channel 426. The call is terminated when one of the parties signals the end of the call. In FIG. 3B, User A signals the end of the telephone call by sending a BYE call message 490 to User B's data network telephone 218. The data network telephone 208, 218 may use the BYE message 490 to clear the displayed commercial message 316 and/or to clear any assignments to the speed dial keys 128. Alternatively, a specific message to clear the commercial message 218 or to display other information may be sent in a status reply 432.

5. Alternative Embodiment And Message Flow

As shown in FIGS. 3A and 3B and as described above, the service provider may provide advertisement services by inserting commercial messages in the response message sent in response to a request to initiate a telephone call. An advantage of using the embodiment described with reference to FIG. 3A is that the advertisement services are provided without generating any new traffic on the data network 206.

Figure 4A:
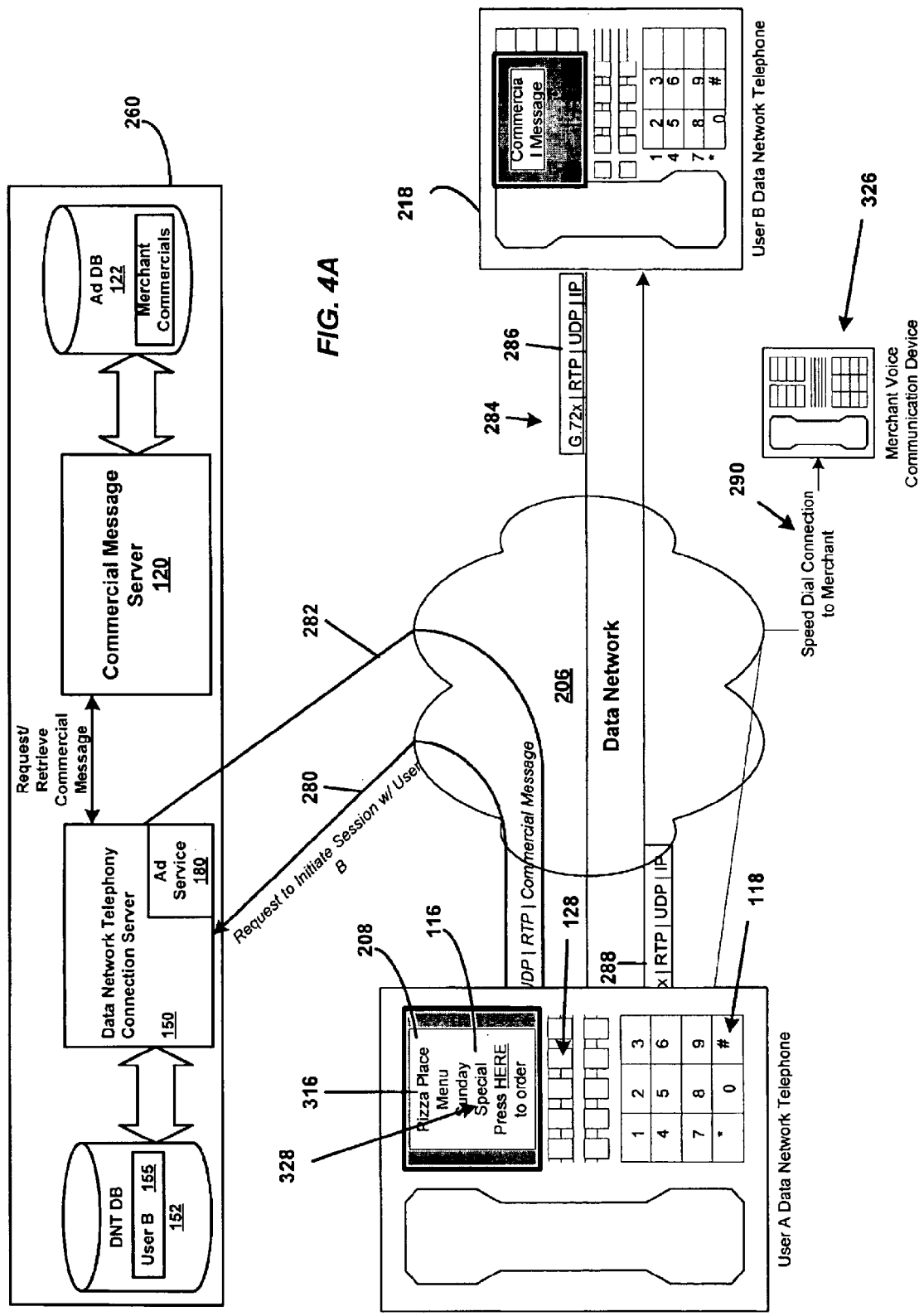
FIG. 4A is a block diagram showing the interaction between components in accordance with another example of a system and method for advertising using the data network telephony system in FIG. 2A.

Alternative embodiments may also be used. FIG. 4A illustrates one alternative embodiment for providing advertisement services by a host 260 of the service provider. The host 260 in the service provider shown in FIG. 4A may be configured to provide advertising services for subscribing merchants in the same or similar manner as the host 160 in FIG. 3A. The host 260 in FIG. 4A also initiates the telephone call containing the voice over data channel 284 in the same or similar manner as the host 160 of FIG. 3A. However, the telephony connection server 150 establishes a separate data communication channel at 282 to communicate the commercial messages.

The telephony connection server 150 retrieves the commercial messages from the commercial message server 120 and uses the connection information to establish the separate data communications channel at 282. The separate data communications channel at 282 is shown to include the use of the IP, UDP, and RTP protocols, however, any other protocol combination may be used. In addition, the telephony connection server 150 may also establish a separate data communications channel with User B's data network telephone 218, as an alternative to User A's data network telephone 208, or simultaneously with it.

The embodiment shown in FIG. 4A may result in additional traffic generated as compared with the embodiment of FIG. 3A. However, one advantage of the embodiment of FIG. 4A is that the communication of commercial messages may continue throughout the time of the telephone call. Multiple commercial messages may be communicated simultaneously or in series. Commercial messages may appear in the form of a banner. Commercial messages from different merchants may also be sent. The choice of commercial messages to be sent does not have to be made at the initiation of the telephone call. The advertisement service 180 may control the separate data communications channel at 282 and select different commercial messages for different merchants as the telephone call proceeds.

Figure 4B:
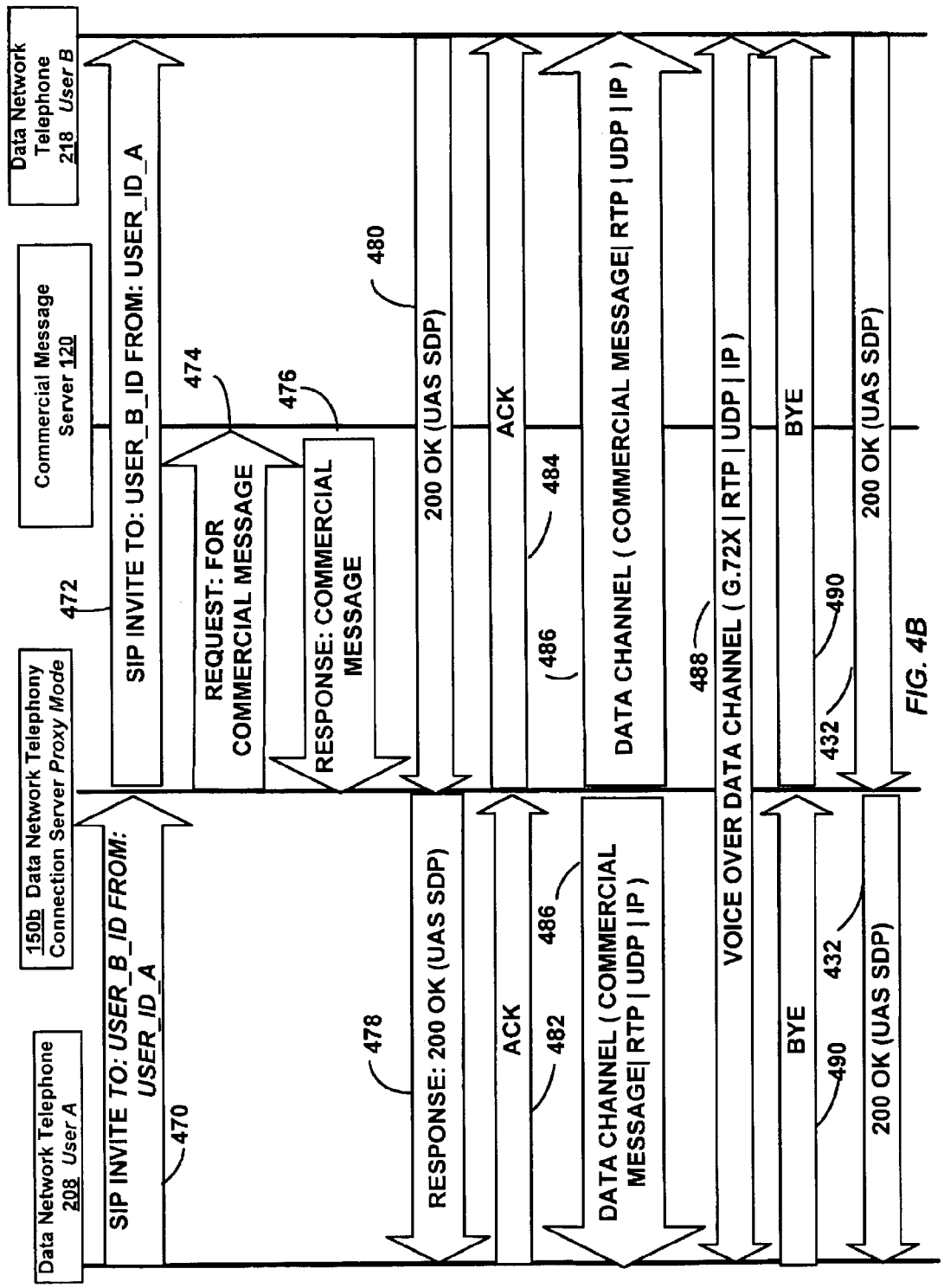
FIG. 4B is a block diagram showing the message flow in the embodiment shown in FIG. 4A.

FIG. 4B shows an example of the message flow occurring in the communications described with reference to FIG. 4A using SIP as the call protocol. The SIP Invite message 470 in FIG. 3B from User A at the data network telephone 208 is the request to initiate a call at 280. The telephony connection server 150 sends the SIP Invite message 472 to the data network telephone 218 belonging to User B. Messages 474 and 476 in FIG. 3B, which are not SIP messages, is the connection information and commercial message exchange in FIG. 3A. SIP Response message 480 is a response from the data network telephone 218 to the SIP Invite message 470, which is received at the telephony connection server 150.

The telephony connection server 150 sends the SIP response message 478 to User A's data network telephone 208. User A's data network telephone 208 sends a SIP Ack message 424 to User B's data network telephone 424 to complete the initiation of the telephone call.

The data communications channel 282 that carries the commercial message in FIG. 3A is shown at 486 in FIG. 4B. The voice over data channel 284 in FIG. 4A is shown in FIG. 4B as a voice over data channel 488. The call is terminated when one of the parties signals the end of the call. In FIG. 4B, User A signals the end of the telephone call by sending an END call message 490 to User B's data network telephone 218.

In FIG. 4B, User A signals the end of the telephone call by sending a BYE call message 490 to User B's data network telephone 218. The data network telephone 208, 218 may use the BYE message 490 to clear the displayed commercial message 316 and/or to clear any assignments to the speed dial keys 128. Alternatively, a specific message to clear the commercial message 218 or to display other information may be sent in a status reply 432.

D. Providing Advertisement Services with an Independent Service Provider

Figure 5A:
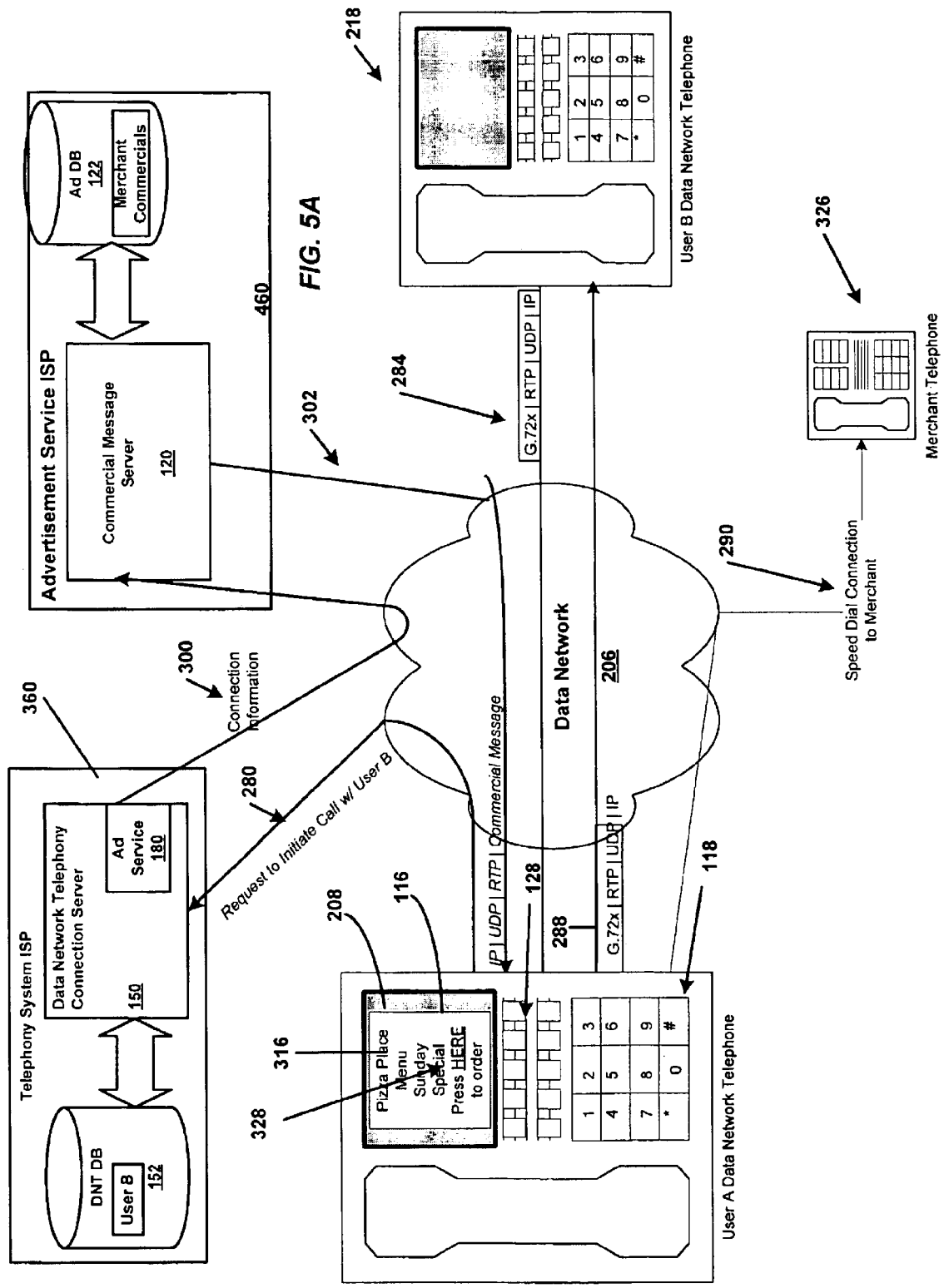
FIG. 5A is a block diagram showing the interaction between components in accordance with another example of a system and method for advertising using the data network telephony system in FIG. 2A.

FIG. 5A illustrates another embodiment for providing advertisement services in which telephony services are provided by one telephony system host 360 and advertisement services are provided by an advertisement service host 460. The advantage of the embodiment shown in FIG. 5A is that the advertisement service host 460 may be a computer on a network operated by a merchant. The merchant, in such a case, may receive, by purchase or subscription, connection information 300 from the telephony system host 360 and use the advertisement service host 460 on the merchant premises to provide advertising. The advertisement service 180 in FIG. 5A may send connection information 300 for calls handled by the data network telephony server 150 to the commercial message server in the advertisement service host 460. Alternatively, the merchant may subscribe or purchase advertisement from a service provider that is dedicated to advertising.

The advertisement service 180 may send the connection information 300 to the advertisement service host 460 when the telephony connection server 150 detects that User B's data network telephone 218 is a party (callee or caller) to the telephone connection. Alternatively, the advertisement service 180 may send the connection information 300 for any parties to the telephone call, or for parties designated by time of day or geographic location or by domain.

Once the commercial message server 120 receives the connection information 120, commercial messages are retrieved from the commercial message database 122 and a commercial data communications channel 302 may be established by the commercial message server 120. A data communications channel similar or identical to the commercial data communications channel 302 may also be established with User B's data network telephone 218.

Figure 5B:
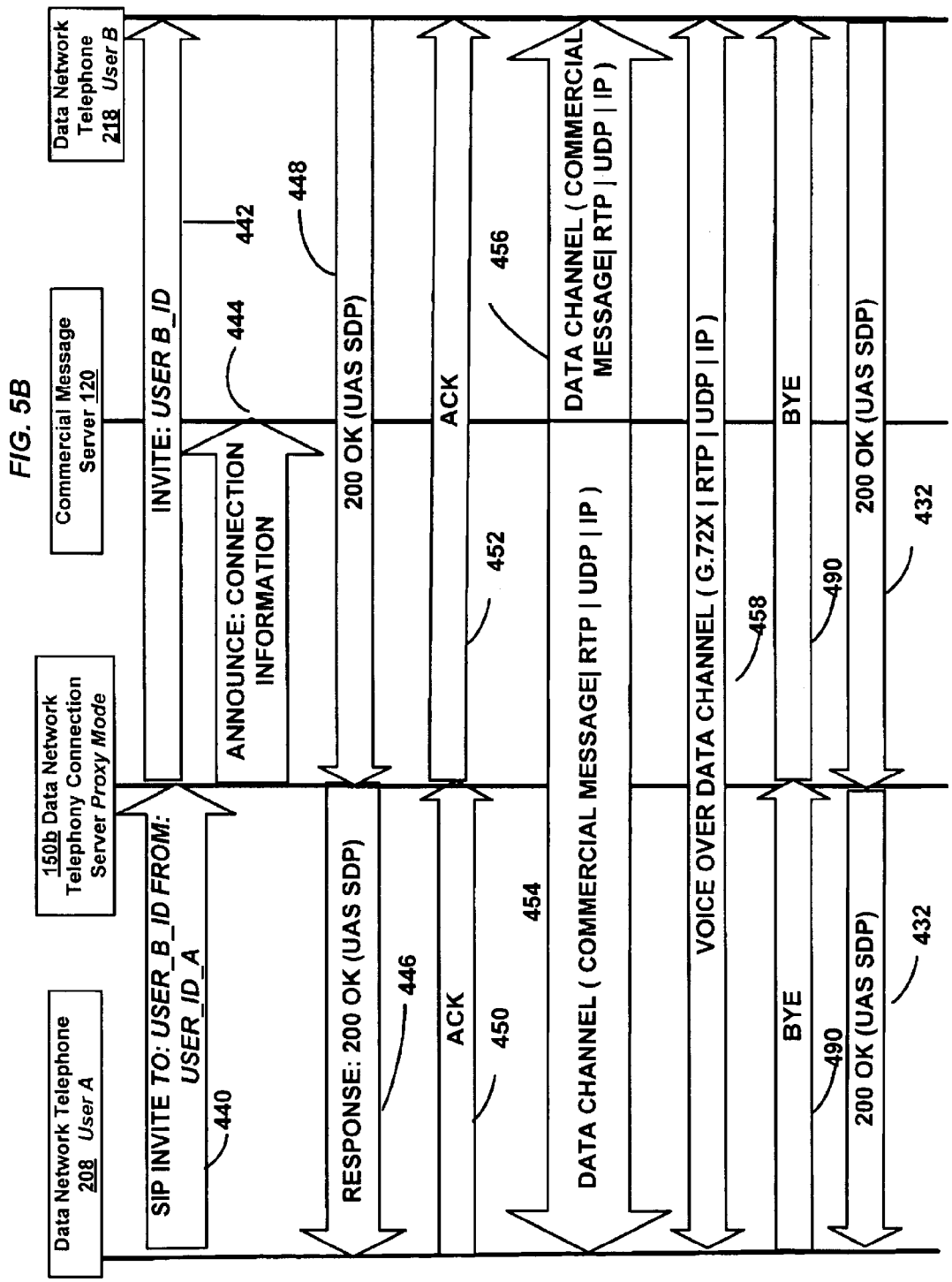
FIG. 5B is a block diagram showing the message flow in the embodiment shown in FIG. 5A.

FIG. 5B shows an example of the message flow occurring in the communications described with reference to FIG. 5A using SIP as the call protocol. The SIP Invite message 440 in FIG. 5B from User A at the data network telephone 208 is the request to initiate a call at 280. The telephony connection server 150 sends the SIP Invite message 442 to the data network telephone 218 belonging to User B. Message 444 in FIG. 5B, which is not a SIP message, is communicate on the connection information channel at 300 in FIG. 3A. SIP Response message 448 is a response from the data network telephone 218 to the SIP Invite message 440, which is received at the telephony connection server 150.

The telephony connection server 150 sends the SIP response message 420 to User A's data network telephone 208. User A's data network telephone 208 sends a SIP Ack message 450 to User B's data network telephone 218 to complete the initiation of the telephone call.

The communications channel that carries the commercial messages at 302 in FIG. 5A is shown in FIG. 5B as a first data channel 454. FIG. 5B also shows a second data channel 456 communicating commercial messages to User B's data network telephone 218. The first and second data channels 454, 456 may communicate commercial messages throughout the duration of the telephone call. The voice over data channel 284 in FIG. 5A is shown in FIG. SB as a voice over data channel 458. The call is terminated when one of the parties signals the end of the call. In FIG. 5B, User A signals the end of the telephone call by sending an END call message 460 to User B's data network telephone 218.

In FIG. 5B, User A signals the end of the telephone call by sending a BYE call message 490 to User B's data network telephone 218. The data network telephone 208, 218 may use the BYE message 490 to clear the displayed commercial message 316 and/or to clear any assignments to the speed dial keys 128. Alternatively, a specific message to clear the commercial message 218 or to display other information may be sent in a status reply 432.

For any of the embodiments shown in FIGS. 3–5, the connection information may also be communicated to the commercial message server 120 to signal the end of the telephone call. The commercial message server 120 would then know to discontinue the communication of the commercial messages.

One advantage of using a data network telephony system for advertising is the flexibility provided by the system to implement features in a variety of ways. The methods used with the systems as described above may be carried out using any suitable system configuration.

Figure 6:
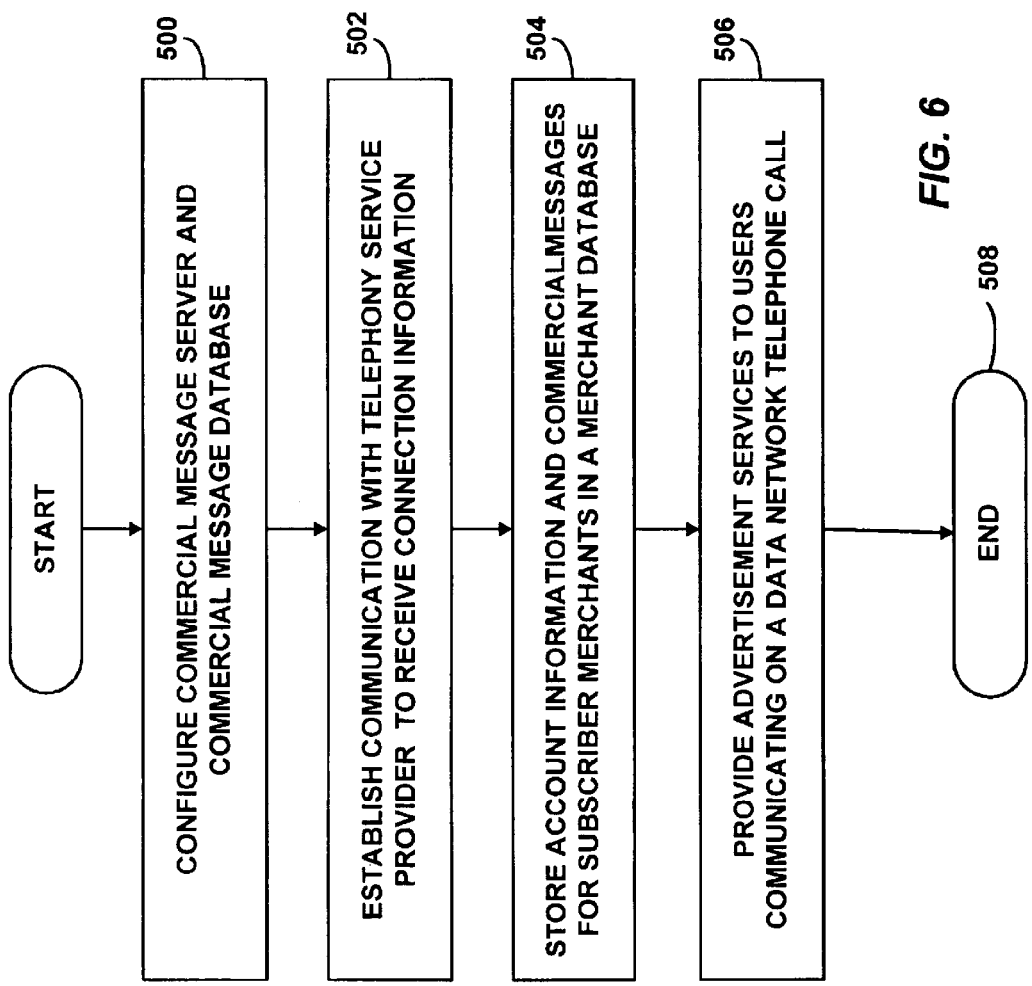
FIG. 6 is a flowchart showing an example of a method for providing advertising services using the data network telephony system of FIG. 1.
Figure 7:
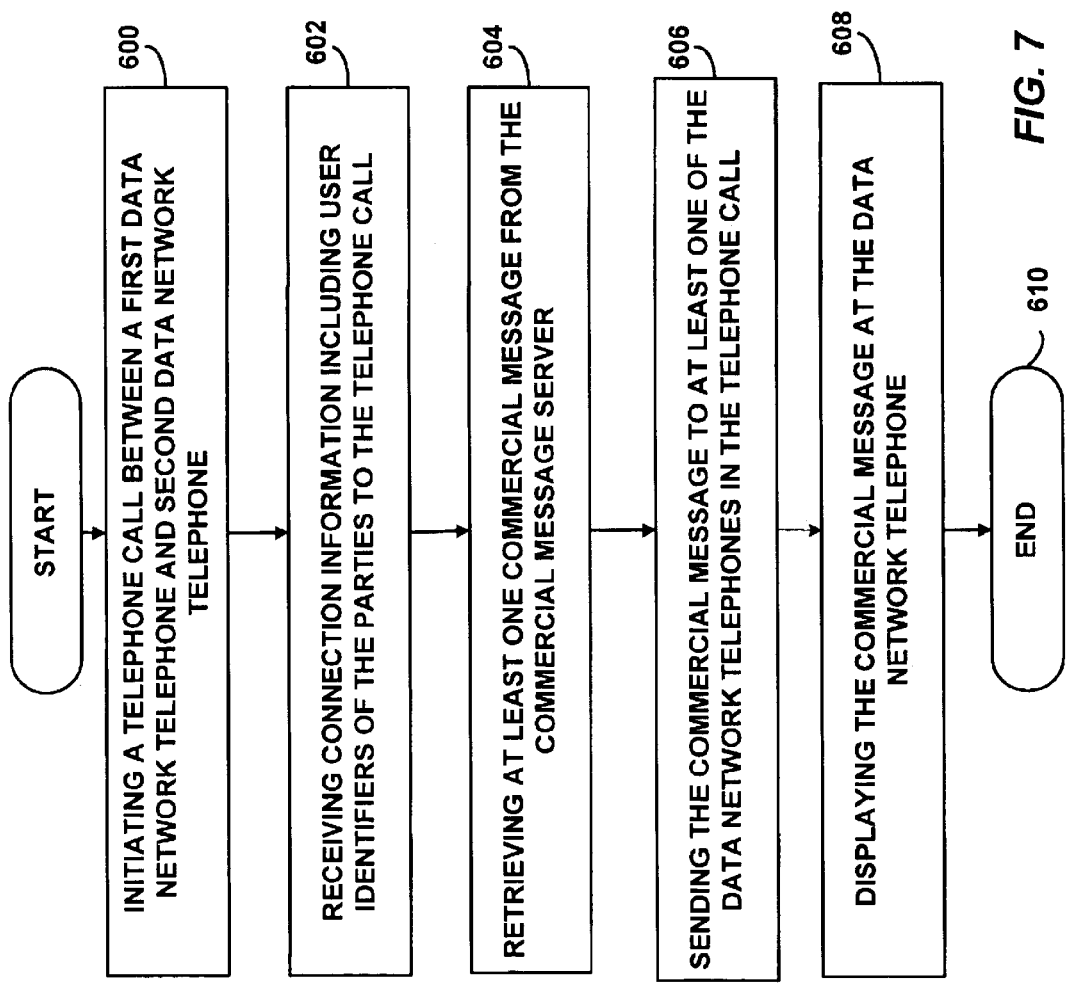
FIG. 7 is a flowchart showing an example of a method for advertising using the data network telephony system of FIG. 1.
Figure 8:
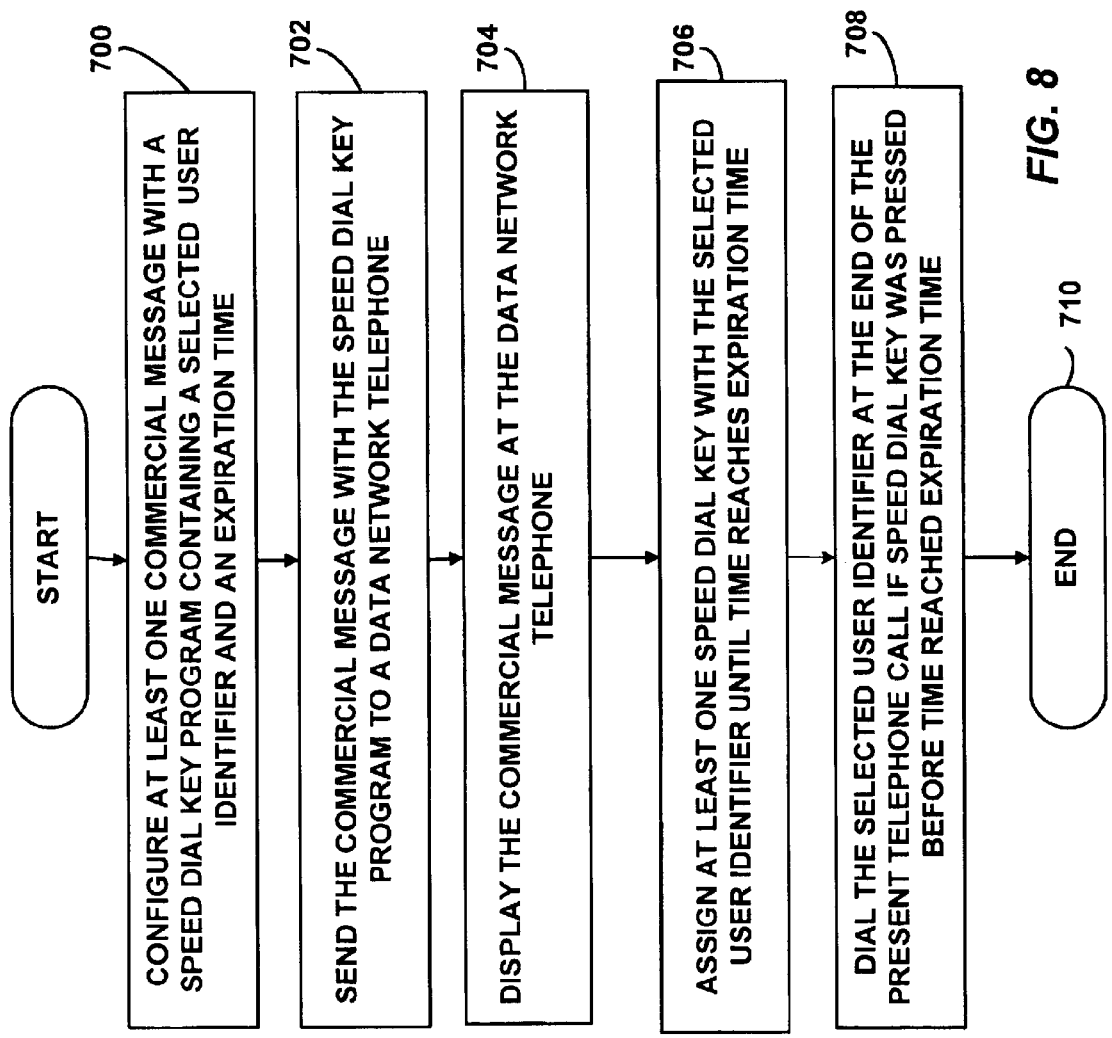
FIG. 8 is a flowchart showing an example of providing speed dial key programming in commercial messages transported using the method described in FIG. 7.

E. Methods for Providing Advertisement Using a Data Network Telephony System FIGS. 6–8 illustrate methods for providing advertising services on a telephone using the system described in FIG. 1. FIG. 6 is a flowchart showing a method of providing advertising services that may be implemented by a service provider. Service providers may augment existing services with advertising services to generate revenue, or establish an advertisement service as a business to become ad service providers.

As shown at step 500 in FIG. 6, a service provider starts by configuring a commercial message server and a commercial message database. The step of configuring the commercial message server and database includes steps of storing merchant commercials in the commercial message database, and may include a step of relating the commercial messages with a merchant account.

At step 502, the ad service provider communicates with a telephony service provider to receive connection information. The service provider uses the connection information to determine the telephone calls that have been established at any given time and to determine user identifiers of the parties to the telephone calls. The service provider and the telephony service provider may belong to the same enterprise making step 502 an easy one. If they belong to different enterprises, the communication may require a that the ad service provider purchase the connection information, and may obtain connection information having selected parameters, such as time of day of the telephone call, geographic location of the parties, etc.

At step 504, the ad service provider obtains subscriptions from merchants that with to advertise over telephones and stores the account information in a merchant database. Step 504 presumes that the ad service provider is performing advertisement to generate revenues. Step 504 may only implement the storing of commercial messages if a merchant configures the commercial message server and database to advertise on telephones that call to the merchant's telephone.

At step 506, the ad service provider provides the advertisement services to the subscribing merchants by implementing the method described below with reference to FIG. 7. At step 506, where the ad service provider is part of an independent enterprise, the sending of the commercial messages may be performed by the ad service provider, or by the telephony service provider.

FIG. 7 is a flowchart that shows a method for advertising on a data network telephony system. Starting at step 600, a telephone call is initiated between a first and second data network telephone. At step 602, the ad service provider receives connection information including the user identifiers of the parties, or other identifier such as an IP address that would allow connection to the parties. At step 604, the ad service provider retrieves at least one commercial message from the commercial message server. At step 606, the commercial message is sent to the data network telephone corresponding to one or both of the user identifiers received in the connection information. Step 606 may be performed by sending the commercial message on a message used by a call management protocol, if such a protocol supports the insertion of a message in one its messages. Alternatively, the commercial message may be sent over a data communications channel. At step 608, the commercial message is displayed on the data network telephone.

FIG. 8 is a flowchart showing a method for providing speed dial programming with the commercial messages. At step 700, an ad service provider may configure commercial messages with speed dial key programs. The speed dial key programs contain one or more selected user identifiers and an expiration time. The selected user identifiers may be telephone numbers or other type of user identifier that connects the user to the merchant displaying the commercial message or to one or more of the merchant's services. The expiration time may be infinite, such that the speed dial key assignment is permanent. The expiration time may be fixed to a certain time. The expiration time may also be set to the time of the telephone call in which the commercial message is used, such as, for example, the telephone call initiated at step 600 in FIG. 7.

At step 702, the commercial message with the speed dial key program is sent to a data network telephone using, for example, the steps in the flowchart in FIG. 7. At step 704, the commercial message is displayed on the data network telephone. At step 706, at least one speed dial key is programmed or assigned the selected user identifier(s) for the duration of the indicated expiration time. If a user presses the programmed speed dial keys during the expiration time, the selected user identifier is dialed at step 708, preferably at the end of the telephone call. The dialing at step 708 need not however, wait until the end of the telephone call. One advantage of using the data network telephone system of FIG. 1 is that the data network telephones may communicate on more than one channel simultaneously. Multiple voice channels may be used for conferencing, or a data channel with no voice may be connected while the voice over data channel performs the telephone call.

For example, during a telephone conversation, two users may discuss dinner plans. During the conversation, an advertisement for a restaurant is displayed with a speed dial button assigned for retrieval of a menu or for making reservations or both. The user identifier for accessing the menu may be dialed during the telephone conversation and the menu may be displayed on both parties' telephone. Reservations may then be made by pressing another speed dial number, or by other data interactive means.

While the invention has been described in conjunction with presently preferred embodiments of the invention, persons of skill in the art will appreciate that variations may be made without departure from the scope and spirit of the invention. For example, the access networks shown in FIG. 2A may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for providing advertising on a data network telephony system comprising:
    a data network to provide data connectivity for a plurality of data communications channels using data transport protocols;
    a commercial message server being operable to download at least one commercial message;
    a first and second data network telephone connected to the data network, each data network telephone operable to communicate voice signals as data packets on a voice over data channel, the voice over data channel being one of the plurality of data communications channels on the data network containing packetized voice signals, the data network telephones identified by a first and second user identifier corresponding to the data network telephones;
    a network telephony connection server being operable to provide telephony service to the data network telephones and communicate at least one commercial message request with the commercial message server; and
    the first data network telephone being operable to receive the downloaded commercial messages before the first and second data network telephones communicate voice signals on the voice over data channel, the first data network telephone further comprising a message display device to display the commercial messages;
    wherein each user identifier includes a unique sequence of alphanumeric elements; and
    wherein the first data network telephone further comprises at least one speed dial operable to initiate a second voice data channel to a called party at a selected voice communications device when the speed dial key is assigned to the called party's user identifier.

2. The system of claim 1 wherein the data network telephone further comprises a speed dial function to assign a selected user identifier to the at least one speed dial key when the commercial message includes the selected user identifier.

3. A commercial message server comprising:
    at least one commercial message for display on a voice communications device;
    a telephony connection server interface to receive connection information from a telephony connection server, the connection information comprising at least one user identifier for at least one party to a telephone call, the at least one party using the voice communications device to initiate the telephone call; and
    the commercial message server being operable to download the commercial message to the voice communications device in use by the at least one party identified by the user identifier prior to communicating voice signals to the voice communications device;
    the commercial message server further comprising a data network interface to communicate the commercial message to the user identifier using a data communications channel; and
    wherein the data communications channel uses an RTP protocol to transport the commercial message.

4. A system for providing advertising on a data network telephony system comprising:
    a data network to provide data connectivity for a plurality of data communications channels using data transport protocols;
    a commercial message server connected to the data network, the commercial message server being operable to send at least one commercial message;
    a first and second data network telephones connected to the data network, each data network telephone operable to communicate voice signals as data packets on a voice over data channel, the voice over data channel being one of the plurality of data communications channels on the data network containing packetized voice signals, the data network telephones being operable to convert data packets communicated on the voice over data channel to voice;
    the first data network telephone being operable to receive the commercial messages, the first data network telephone further comprising a message display device to display the commercial messages;
    a network telephony user database connected to the data network to store a user identifier and a telephone identifier corresponding to the user identifier for each of a plurality of users, wherein the user identifier includes a first sequence of alphanumeric elements that identify a corresponding user and the telephone identifier includes a second unique sequence of alphanumeric elements that identifies a corresponding data network telephone; and
    a network telephony connection server operable to receive a request message from the first data network telephone to initiate the voice over data channel with the second data network telephone, and to send a response message in response to the request message, wherein the request and response messages are communicated by the network telephony connection server in accordance with a protocol selected from the group consisting of: the Session Initiation Protocol (SIP), the H.323 protocol, the MGCP protocol and the MEGACO protocol.

5. A telephony connection server comprising:

a call management function operable to receive a request to initiate a telephone call using at least one voice communications device, and to send a response message in response to the request message;

the call management function operates using a call management protocol selected from the group of protocols consisting of: the Session Initiation Protocol (SIP), the H.323 protocol, the MGCP protocol and the MEGACO protocol;

a network telephony user database to store a user identifier for each of a plurality of users, wherein the user identifier includes a first sequence of alphanumeric elements that identify a user of a voice communications device; and an advertisement service to retrieve at least one commercial message from a commercial message server and to communicate the commercial messages in the response message.

6. The telephony connection server of claim 5 wherein the commercial message is communicated in a SIP response message.

7. The telephony connection server of claim 5 wherein the telephony connection server is operable to send the request to initiate the telephone call to a callee party at a second voice communications device, and wherein:

the commercial message is communicated in the request to initiate.

* * * * *